(12) United States Patent
Weiss

(10) Patent No.: US 10,636,023 B2
(45) Date of Patent: Apr. 28, 2020

(54) UNIVERSAL SECURE REGISTRY

(71) Applicant: UNIVERSAL SECURE REGISTRY, LLC, Newton, MA (US)

(72) Inventor: Kenneth P. Weiss, Newton, MA (US)

(73) Assignee: UNIVERSAL SECURE REGISTRY, LLC, Newton, MA (US)

( * ) Notice: Subject to any disclaimer, the term of this patent is extended or adjusted under 35 U.S.C. 154(b) by 0 days.

(21) Appl. No.: 15/661,482

(22) Filed: Jul. 27, 2017

(65) Prior Publication Data

US 2017/0337538 A1 Nov. 23, 2017

Related U.S. Application Data

(63) Continuation of application No. 15/040,873, filed on Feb. 10, 2016, now Pat. No. 9,754,250, which is a (Continued)

(51) Int. Cl.
*H04L 9/32* (2006.01)
*G06F 21/62* (2013.01)
(Continued)

(52) U.S. Cl.
CPC ....... *G06Q 20/204* (2013.01); *G06F 21/6245* (2013.01); *G06Q 20/34* (2013.01);
(Continued)

(58) Field of Classification Search
CPC .............................. G06Q 20/04; G06F 21/6245
See application file for complete search history.

(56) References Cited

U.S. PATENT DOCUMENTS

| 4,720,860 A | 1/1988 | Weiss |
| 4,856,062 A | 8/1989 | Weiss |

(Continued)

FOREIGN PATENT DOCUMENTS

| EA | 0986209 A2 | 3/2000 |
| EP | 1028401 A2 | 8/2000 |

(Continued)

OTHER PUBLICATIONS

Jin et al., Biohashing: two factor authentication featuring fingerprint data and tokenized random number, Pattern Recognition 37 (11), pp. 2245-2255 (2004).

(Continued)

*Primary Examiner* — Talia F Crawley
(74) *Attorney, Agent, or Firm* — Lando & Anastasi, LLP

(57) ABSTRACT

An authentication system and method of use thereof are provided to authenticate a user involved in a transaction. The system comprises a communications interface configured to receive a one-time code generated by an electronic device, wherein the one-time code is generated by an electronic device responsive to successful verification of biometric information at the point of use of the electronic device, and one or more processors configured to retrieve account information associated with a user of the electronic device, wherein the account information is retrieved in response to receiving the one-time code, and to use the retrieved account information to access account identifying information or identifying information associated with the user of the electronic device.

40 Claims, 14 Drawing Sheets

US 10,636,023 B2
Page 2

Related U.S. Application Data continuation of application No. 14/508,483, filed on Oct. 7, 2014, which is a continuation of application No. 11/768,729, filed on Jun. 26, 2007, now Pat. No. 8,856,539, which is a continuation of application No. 09/810,703, filed on Mar. 16, 2001, now Pat. No. 7,237,117.

(51) Int. Cl.
*H04L 29/06* (2006.01)
*G06Q 20/38* (2012.01)
*G06Q 20/20* (2012.01)
*G06Q 20/34* (2012.01)
*G06Q 20/40* (2012.01)

(52) U.S. Cl.
CPC ......... *G06Q 20/382* (2013.01); *G06Q 20/383* (2013.01); *G06Q 20/3829* (2013.01); *G06Q 20/409* (2013.01); *G06Q 20/40145* (2013.01); *H04L 63/102* (2013.01); *H04L 63/105* (2013.01); *G06Q 2220/00* (2013.01); *H04L 2463/102* (2013.01); *Y10S 707/99931* (2013.01); *Y10S 707/99933* (2013.01); *Y10S 707/99939* (2013.01)

(56) References Cited

U.S. PATENT DOCUMENTS

| | | | |
|---|---|---|---|
| 4,885,778 A | 12/1989 | Weiss | |
| 4,998,279 A | 3/1991 | Weiss | |
| 5,023,908 A | 6/1991 | Weiss | |
| 5,058,161 A | 10/1991 | Weiss | |
| 5,097,505 A | 3/1992 | Weiss | |
| 5,168,520 A | 12/1992 | Weiss | |
| 5,237,614 A | 8/1993 | Weiss | |
| 5,280,527 A | 1/1994 | Gullman et al. | |
| 5,361,062 A | 11/1994 | Weiss et al. | |
| 5,367,572 A | 11/1994 | Weiss | |
| 5,398,285 A | 3/1995 | Borgelt et al. | |
| 5,457,747 A | 10/1995 | Drexler et al. | |
| 5,479,512 A | 12/1995 | Weiss | |
| 5,485,519 A | 1/1996 | Weiss | |
| 5,615,277 A | 3/1997 | Hoffman | |
| 5,657,388 A | 8/1997 | Weiss | |
| 5,664,109 A | 9/1997 | Johnson et al. | |
| 5,813,006 A | 9/1998 | Polnerow et al. | |
| 5,870,723 A | 2/1999 | Pare, Jr. et al. | |
| 5,915,023 A | 6/1999 | Bernstein | |
| 5,930,767 A | 7/1999 | Reber et al. | |
| 5,971,272 A | 10/1999 | Hsiao | |
| 6,000,832 A | 12/1999 | Franklin et al. | |
| 6,016,476 A | 1/2000 | Maes et al. | |
| 6,073,106 A | 6/2000 | Rozen et al. | |
| 6,088,450 A | 7/2000 | Davis et al. | |
| 6,130,621 A | 10/2000 | Weiss | |
| 6,163,771 A | 12/2000 | Walker et al. | |
| 6,202,055 B1 | 3/2001 | Houvener et al. | |
| 6,253,202 B1 | 6/2001 | Gilmour | |
| 6,253,203 B1 | 6/2001 | O'Flaherty et al. | |
| 6,260,039 B1 | 7/2001 | Schneck et al. | |
| 6,308,203 B1 | 10/2001 | Itabashi et al. | |
| 6,309,342 B1 | 10/2001 | Blazey et al. | |
| 6,393,421 B1 | 5/2002 | Paglin | |
| 6,453,301 B1 | 9/2002 | Niwa | |
| 6,498,861 B1 | 12/2002 | Hamid et al. | |
| 6,516,315 B1 | 2/2003 | Gupta | |
| 6,546,005 B1 | 4/2003 | Berkley et al. | |
| 6,581,059 B1 | 6/2003 | Barrett et al. | |
| 6,640,211 B1 | 10/2003 | Holden | |
| 6,658,400 B2 | 12/2003 | Perell et al. | |
| 6,678,821 B1 | 1/2004 | Waugh et al. | |
| 6,819,219 B1 | 11/2004 | Bolle et al. | |
| 6,820,204 B1 | 11/2004 | Desai et al. | |
| 6,845,448 B1 | 1/2005 | Chaganti et al. | |
| 6,941,271 B1 | 9/2005 | Soong | |
| 6,950,521 B1 | 9/2005 | Marcovici et al. | |
| 6,950,939 B2 | 9/2005 | Tobin | |
| 7,007,298 B1 | 2/2006 | Shinzaki et al. | |
| 7,237,117 B2 | 6/2007 | Weiss | |
| 7,249,112 B2 | 7/2007 | Berardi et al. | |
| 7,278,026 B2 | 10/2007 | McGowan | |
| 7,412,604 B1 | 8/2008 | Doyle | |
| 7,489,781 B2 | 2/2009 | Klassen et al. | |
| 7,502,459 B1 | 3/2009 | Moseley | |
| 7,548,981 B1 | 6/2009 | Taylor et al. | |
| 7,552,333 B2 | 6/2009 | Wheeler et al. | |
| 7,552,467 B2 | 6/2009 | Lindsay | |
| 7,567,934 B2 | 7/2009 | Flitcroft et al. | |
| 7,571,139 B1* | 8/2009 | Giordano | G06Q 20/04 705/37 |
| 7,597,250 B2 | 10/2009 | Finn | |
| 7,657,639 B2 | 2/2010 | Hinton | |
| 7,705,732 B2 | 4/2010 | Bishop et al. | |
| 7,742,967 B1* | 6/2010 | Keresman, III | G06Q 20/04 705/37 |
| 7,766,223 B1 | 8/2010 | Mello et al. | |
| 7,805,372 B2 | 9/2010 | Weiss | |
| 7,809,651 B2 | 10/2010 | Weiss | |
| 7,865,448 B2 | 1/2011 | Pizarro | |
| 8,001,055 B2 | 8/2011 | Weiss | |
| 8,079,079 B2 | 12/2011 | Zhang et al. | |
| 8,219,495 B2 | 7/2012 | Niwa | |
| 8,234,220 B2 | 7/2012 | Weiss | |
| 8,271,397 B2 | 9/2012 | Weiss | |
| 8,380,637 B2 | 2/2013 | Levovitz | |
| 8,423,466 B2 | 4/2013 | Lanc | |
| 8,433,919 B2 | 4/2013 | Giobbi et al. | |
| 8,538,881 B2 | 9/2013 | Weiss | |
| 8,577,813 B2 | 11/2013 | Weiss | |
| 8,594,632 B1 | 11/2013 | Azizi et al. | |
| 8,613,052 B2 | 12/2013 | Weiss | |
| 8,751,801 B2 | 6/2014 | Harris et al. | |
| 8,814,046 B1 | 8/2014 | Wallner | |
| 8,838,502 B2 | 9/2014 | Niwa | |
| 8,856,539 B2* | 10/2014 | Weiss | G06F 21/6245 713/182 |
| 9,100,826 B2 | 8/2015 | Weiss | |
| 9,530,137 B2 | 12/2016 | Weiss | |
| 9,531,696 B2 | 12/2016 | Weiss | |
| 2001/0029485 A1 | 10/2001 | Brody et al. | |
| 2001/0032100 A1 | 10/2001 | Mahmud et al. | |
| 2001/0044900 A1 | 11/2001 | Uchida | |
| 2002/0046061 A1 | 4/2002 | Wright et al. | |
| 2002/0090930 A1 | 7/2002 | Fujiwara et al. | |
| 2002/0176610 A1 | 11/2002 | Okazaki et al. | |
| 2002/0178364 A1 | 11/2002 | Weiss | |
| 2002/0184500 A1 | 12/2002 | Maritzen et al. | |
| 2002/0184538 A1 | 12/2002 | Sugimura et al. | |
| 2002/0188574 A1 | 12/2002 | Niwa | |
| 2002/0194499 A1 | 12/2002 | Audebert et al. | |
| 2003/0014372 A1 | 1/2003 | Wheeler et al. | |
| 2003/0028481 A1 | 2/2003 | Flitcroft et al. | |
| 2003/0037233 A1 | 2/2003 | Pearson | |
| 2003/0046540 A1 | 3/2003 | Nakamura et al. | |
| 2003/0061171 A1 | 3/2003 | Gilbert et al. | |
| 2003/0000745 A1 | 4/2003 | Kinsella et al. | |
| 2003/0074568 A1 | 4/2003 | Kinsella et al. | |
| 2003/0084332 A1 | 5/2003 | Krasinski et al. | |
| 2003/0085808 A1 | 5/2003 | Goldberg | |
| 2003/0115378 A1 | 6/2003 | Zondervan et al. | |
| 2003/0115490 A1 | 6/2003 | Russo et al. | |
| 2003/0123713 A1 | 7/2003 | Geng | |
| 2003/0129965 A1 | 7/2003 | Siegel | |
| 2003/0139984 A1 | 7/2003 | Seigel | |
| 2003/0163710 A1 | 8/2003 | Ortiz et al. | |
| 2003/0219121 A1 | 11/2003 | van Someren | |
| 2003/0226017 A1 | 12/2003 | Palekar et al. | |
| 2003/0226041 A1 | 12/2003 | Palmer et al. | |
| 2003/0229637 A1 | 12/2003 | Baxter et al. | |
| 2004/0014423 A1 | 1/2004 | Croome et al. | |
| 2004/0017934 A1 | 1/2004 | Kocher | |
| 2004/0019564 A1 | 1/2004 | Goldthwaite et al. | |

(56) References Cited

U.S. PATENT DOCUMENTS

| | | |
|---|---|---|
| 2004/0034771 A1 | 2/2004 | Edgett et al. |
| 2004/0059923 A1 | 3/2004 | ShamRao |
| 2004/0083170 A1 | 4/2004 | Bam et al. |
| 2004/0088369 A1 | 5/2004 | Yeager et al. |
| 2004/0107170 A1 | 6/2004 | Labrou et al. |
| 2004/0111625 A1 | 6/2004 | Duffy et al. |
| 2004/0117215 A1 | 6/2004 | Marchosky |
| 2004/0117302 A1 | 6/2004 | Weichert et al. |
| 2004/0131185 A1 | 7/2004 | Kakumer |
| 2004/0133787 A1 | 7/2004 | Doughty et al. |
| 2004/0151351 A1 | 8/2004 | Ito |
| 2004/0181695 A1 | 9/2004 | Walker |
| 2004/0188519 A1 | 9/2004 | Cassone |
| 2004/0230536 A1 | 11/2004 | Fung et al. |
| 2004/0236632 A1 | 11/2004 | Maritzen et al. |
| 2004/0236699 A1 | 11/2004 | Beenau et al. |
| 2005/0001711 A1 | 1/2005 | Doughty et al. |
| 2005/0035847 A1 | 2/2005 | Bonalle et al. |
| 2005/0039027 A1 | 2/2005 | Shapiro |
| 2005/0071231 A1 | 3/2005 | Beenau et al. |
| 2005/0097362 A1 | 5/2005 | Winget et al. |
| 2005/0113070 A1 | 5/2005 | Okabe |
| 2005/0130659 A1 | 6/2005 | Grech et al. |
| 2005/0187843 A1 | 8/2005 | Lapsley et al. |
| 2005/0187873 A1 | 8/2005 | Labrou et al. |
| 2005/0210270 A1 | 9/2005 | Rohatgi et al. |
| 2005/0235148 A1 | 10/2005 | Scheidt et al. |
| 2005/0238147 A1 | 10/2005 | Carro |
| 2005/0238208 A1 | 10/2005 | Sim |
| 2005/0268107 A1 | 12/2005 | Harris et al. |
| 2006/0000900 A1 | 1/2006 | Fernandes et al. |
| 2006/0016884 A1 | 1/2006 | Block et al. |
| 2006/0087999 A1 | 4/2006 | Gustave et al. |
| 2006/0104486 A1 | 5/2006 | Le Saint et al. |
| 2006/0117175 A1 | 6/2006 | Miura et al. |
| 2006/0122939 A1 | 6/2006 | Cohen et al. |
| 2006/0135127 A1 | 6/2006 | Aarnio et al. |
| 2006/0165060 A1 | 7/2006 | Dua |
| 2006/0180660 A1 | 8/2006 | Gray |
| 2006/0191995 A1 | 8/2006 | Stewart et al. |
| 2006/0205388 A1 | 9/2006 | Semple et al. |
| 2006/0206724 A1 | 9/2006 | Schaufele et al. |
| 2006/0256961 A1 | 11/2006 | Brainard et al. |
| 2006/0276226 A1 | 12/2006 | Jiang |
| 2007/0005988 A1 | 1/2007 | Zhang et al. |
| 2007/0016088 A1 | 1/2007 | Grant et al. |
| 2007/0040017 A1 | 2/2007 | Kozlay |
| 2007/0079136 A1 | 4/2007 | Vishik et al. |
| 2007/0118758 A1 | 5/2007 | Takahashi et al. |
| 2007/0124597 A1 | 5/2007 | Bedingfield |
| 2007/0124697 A1 | 5/2007 | Dongelmans |
| 2007/0131759 A1 | 6/2007 | Cox et al. |
| 2007/0136796 A1 | 6/2007 | Sanchez et al. |
| 2007/0140145 A1 | 6/2007 | Kumar et al. |
| 2007/0156436 A1 | 7/2007 | Fisher et al. |
| 2007/0186105 A1 | 8/2007 | Bailey et al. |
| 2007/0186115 A1 | 8/2007 | Gao et al. |
| 2007/0197261 A1 | 8/2007 | Humbel |
| 2007/0198436 A1 | 8/2007 | Weiss |
| 2007/0245152 A1 | 10/2007 | Pizano et al. |
| 2007/0256120 A1 | 11/2007 | Shatzkamer et al. |
| 2007/0265984 A1 | 11/2007 | Santhana |
| 2007/0274242 A1 | 11/2007 | Lamacraft et al. |
| 2007/0288758 A1 | 12/2007 | Weiss |
| 2007/0289000 A1 | 12/2007 | Weiss |
| 2008/0005576 A1 | 1/2008 | Weiss |
| 2008/0021997 A1 | 1/2008 | Hinton |
| 2008/0040274 A1 | 2/2008 | Uzo |
| 2008/0127311 A1 | 5/2008 | Yasaki et al. |
| 2008/0212848 A1 | 9/2008 | Doyle |
| 2008/0275819 A1 | 11/2008 | Rifai |
| 2008/0289030 A1 | 11/2008 | Poplett |
| 2009/0083544 A1 | 3/2009 | Scholnick et al. |
| 2009/0097661 A1 | 4/2009 | Orsini et al. |
| 2009/0144814 A1 | 6/2009 | Sacco |
| 2009/0175507 A1 | 7/2009 | Schaffner |
| 2009/0179743 A1 | 7/2009 | Amtmann |
| 2009/0203355 A1 | 8/2009 | Clark |
| 2009/0247186 A1 | 10/2009 | Ji et al. |
| 2009/0287921 A1 | 11/2009 | Zhu et al. |
| 2009/0292641 A1 | 11/2009 | Weiss |
| 2009/0298514 A1 | 12/2009 | Ullah |
| 2010/0000455 A1 | 1/2010 | Harper |
| 2010/0046443 A1 | 2/2010 | Jia et al. |
| 2010/0095364 A1 | 4/2010 | Norgaard et al. |
| 2010/0241570 A1* | 9/2010 | Keresman, III ....... G06Q 20/04 705/67 |
| 2011/0258120 A1 | 10/2011 | Weiss |
| 2011/0283337 A1 | 11/2011 | Schatzmayr |
| 2012/0004015 A1 | 1/2012 | Le Thierry D'Ennequin |
| 2012/0037479 A1 | 2/2012 | Lucchi et al. |
| 2012/0056681 A1 | 3/2012 | Lee |
| 2012/0130904 A1 | 5/2012 | Weiss |
| 2012/0150750 A1 | 6/2012 | Law et al. |
| 2012/0197808 A1 | 8/2012 | Niwa |
| 2012/0230555 A1 | 9/2012 | Miura et al. |
| 2012/0240195 A1 | 9/2012 | Weiss |
| 2013/0024374 A1 | 1/2013 | Weiss |
| 2013/0307670 A1 | 11/2013 | Ramaci |
| 2013/0318581 A1 | 11/2013 | Counterman |
| 2014/0096216 A1 | 4/2014 | Weiss |
| 2014/0101049 A1 | 4/2014 | Fernandes et al. |
| 2014/0149295 A1 | 5/2014 | Weiss |
| 2014/0196118 A1 | 7/2014 | Weiss |
| 2015/0046340 A1 | 2/2015 | Dimmick |
| 2016/0155121 A1 | 6/2016 | Weiss |

FOREIGN PATENT DOCUMENTS

| | | |
|---|---|---|
| EP | 1081632 A1 | 3/2001 |
| GB | 2382006 A | 5/2003 |
| WO | 1992007436 A1 | 4/1992 |
| WO | 1996036934 A1 | 11/1996 |
| WO | 0014648 A1 | 3/2000 |
| WO | 200106699 A2 | 1/2001 |
| WO | 0113275 A1 | 2/2001 |
| WO | 2001024123 A1 | 4/2001 |
| WO | 200163537 A1 | 8/2001 |
| WO | 2002014985 A2 | 2/2002 |
| WO | 2004051585 A2 | 6/2004 |
| WO | 2005/001751 A1 | 1/2005 |
| WO | 2010000455 A1 | 1/2010 |
| WO | 2012037479 A1 | 3/2012 |

OTHER PUBLICATIONS

Bruce Schneier, Applied Cryptography, 2d Ed (1996).
American Bankers Association, Financial Institution Key Management (Wholesale), ANSI X9.17 (1995).
Petition for Inter Partes Review of U.S. Pat. No. 9,530,137 (IPR2019-00174) dated Nov. 2, 2018.
Complaint, *Universal Secure Registry LLC v. Apple Inc., Visa Inc., and Visa U.S.A., Inc.*, No. 17-585-VAC-MPT (D. Del.).
Niwa, "Method of Using Personal Device with Internal Biometric in Conducting Transactions Over a Network" U.S. Appl. No. 09/510,811.
Plantiff's Answering Brief in Opposition to Defendants' Motion to Dismiss Plaintiff's Complaint in C.A. No. 17-585, filed Mar. 29, 2017.
Petition for Inter Partes Review in U.S. Pat. No. 9,100,826 (IPR2019-00175) dated Nov. 2, 2018.
Petition for Inter Partes Review in U.S. Pat. No. 9,100,826 (IPR2019-00176) dated Nov. 2, 2018.
Petition for Covered Business Method Review in U.S. Pat. No. 8,577,813 (CBM2019-00025) dated Dec. 20, 2018.
Petition for Covered Business Method Review in U.S. Pat. No. 8,577,813 (CBM2019-00026) dated Dec. 20, 2018.
Intel Corp, Baca Jim S, Li Hong, Kohlenberg Tobias M, Stanasolovich David and Price Mark H File WIPO Patent Application for Method for Authentication Using Biometric Data for Mobile Device E-Commerce Transactions Jul. 2, 2013.

(56) References Cited

OTHER PUBLICATIONS

Petition for Inter Partes Review of U.S. Pat. No. 9,100,826 (IPR2018-00810) dated Apr. 3, 2018.
Petition for Inter Partes Review of U.S. Pat. No. 9,100,826 (IPR2018-00813) dated Apr. 3, 2018.
Petition for Covered Business Method Review of U.S. Pat. No. 9,530,137 (CBM2018-00022) dated Apr. 3, 2018.
Petition for Inter Partes Review of U.S. Pat. No. 9,530,137 (IPR2018-00809) dated Apr. 3, 2018.
Petition for Covered Business Method Review of U.S. Pat. No. 8,577,813 (CBM2018-00026) dated May 3, 2018.
Petition for Covered Business Method Review of U.S. Pat. No. 8,577,813 (CBM2018-00025) dated May 3, 2018.
Petition for Covered Business Method Review of U.S. Pat. No. 8,577,813 (CBM2018-00024) dated May 3, 2018.
Petition for Inter Partes Review of U.S. Pat. No. 8,856,539 (IPR2018-00811) dated Apr. 12, 2018.
Petition for Inter Partes Review of U.S. Pat. No. 8,856,539 (IPR2018-00812) dated Apr. 12, 2018.
Petition for Covered Business Method Review of U.S. Pat. No. 8,856,539 (CBM2018-00023) dated Apr. 12, 2018.
Declaration of Dr. Victor Shoup in Case IPR2018-00808.
Webster's New World Dictionary of Computer Terms Eighth Edition, Copyright 2000 (Date Stamped by Library of Congress Mar. 28, 2000).
Microsoft Computer Dictionary Fourth Edition Copyright 1999.
Petition for Inter Partes Review of U.S. Pat. No. 9,530,137 (IPR2018-00808) dated Apr. 4, 2018.
Declaration of Dr. Victor Shoup in Case IPR2018-00809.
Declaration of Dr. Victor Shoup in Case IPR2018-00810.
Declaration of Dr. Victor Shoup in Case IPR2018-00811.
Declaration of Dr. Victor Shoup in Case IPR2018-00812.
Declaration of Dr. Victor Shoup in Case IPR2018-00813.
Declaration of Dr. Victor Shoup in Case CBM2018-00022.
Declaration of Dr. Victor Shoup in Case CBM2018-00023.
Declaration of Dr. Victor Shoup in Case CBM2018-00024.
Declaration of Dr. Victor Shoup in Case CBM2018-00025.
Declaration of Dr. Victor Shoup in Case CBM2018-00026.
Petition for Inter Partes Review of U.S. Pat. No. 8,856,539 (IPR2019-00727) dated Mar. 11, 2019.
Declaration of Dr. Justin Douglas Tygar in Case IPR2019-00727.
Curriculum Vitae of Dr. Doulgas Justin Tygar.
File History for U.S. Pat. No. 8,856,539.
U.S. Appl. No. 60/186,166.
Dynamic, Random House Webster's Unabridged Dictionary, Second Edition, 2001.
Dynamic, The American Heritage Dictionary of the English Language, Third Edition, 1996.
Dynamic, Academic Press Dictionary of Science and Technology, 1992.
"Biometrics: Who's Watching You?", Electronic Frontier Foundation (EFF), Sep. 2003, all pages, http://www.eff.org/wp/biometrics-whos-watching-you.
"Bluetooth Technology FAQ", Mobileinfo.com, Jan. 21, 2001, all pages, http://www.web.archive.org/web/200101211551/http://www.mobileinfo.com/Bluetooth/FAQ.htm.
"FIPS PUB 46-3", National Institute of Science and Technology (NIST), Oct. 25, 1999, all pages.
"Information Security: Challenges in using biometrics", Sep. 9, 2003, all pages, <http://www.gao.gov/news.items/d031137t.pdf>.
"PGP: An introduction to cryptography", 2000, all pages.
"Single Sign on Authentication", Authentication World, Mar. 13, 2007, all pages, retrieved Jul. 9, 2010 via Waybadc Machine, <http://web.archive.org/web/20070313200434/http://www.authenticationworld.com/Single-Sign-On-Authentication/>.
Hungtington, "101 Things to know about single sign on", Authentication World, 2006, all pages, <http://www.authenticationworld.com/Single-Sign-On-Authentication/101ThingsToKnowAboutSingleSignOn.pdf>.
International Search Report and Written Opinion for International Application No. PCT/US2011/051966, 49 pages.
International Search Report from PCT Application No. PCT/US2007/004646 dated Nov. 27, 2007.
International Search Report from PCT Application No. PCT/US2007/070701 dated Mar. 11, 2008.
International Search Report from PCT Application No. PCT/US2009/035282 dated Jul. 10, 2009.
International Search Report from PCT/US2007/070701 dated Mar. 11, 2008.
Kessler, "An overview of cryptography", Aug. 22, 2002, all pages, retrieved via Wayback Machine on Jan. 19, 2010, http://www.garykessler.net/library/crypto.html.
Pabrai, "Biometrics for PC-user authentication: a primer", Access Controls & Security Systems, Feb. 1, 2001, all pages, <http://www.securitysolutions.com/mag/securit_biometrics_pcuser authentication/index.html>.
Treasury Board of Canada Secretariat, PKI for Beginners Glossary, http://www.tbs-sct.gc.ca/pki-icp/beginners/glossary-eng.asp.

* cited by examiner

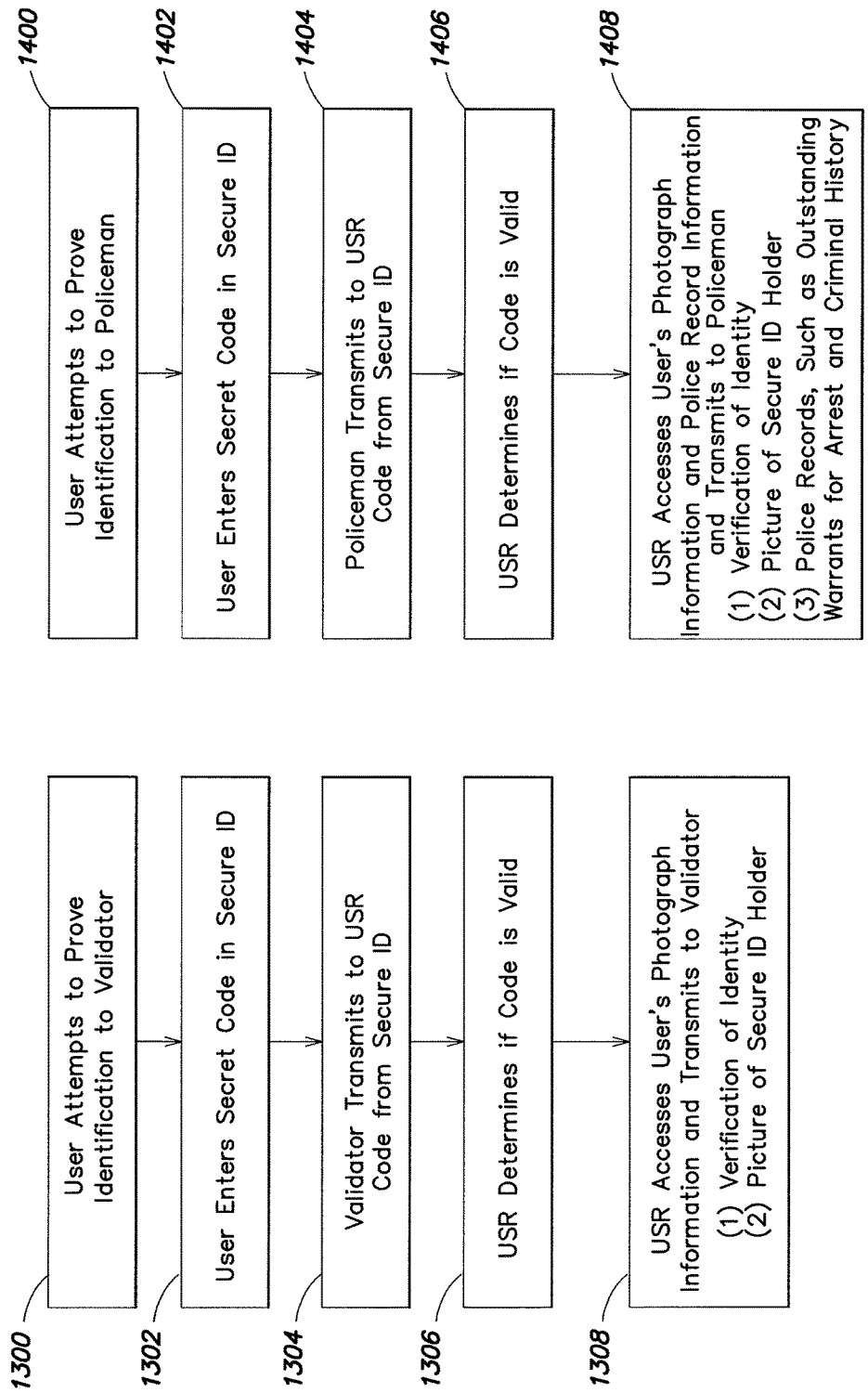

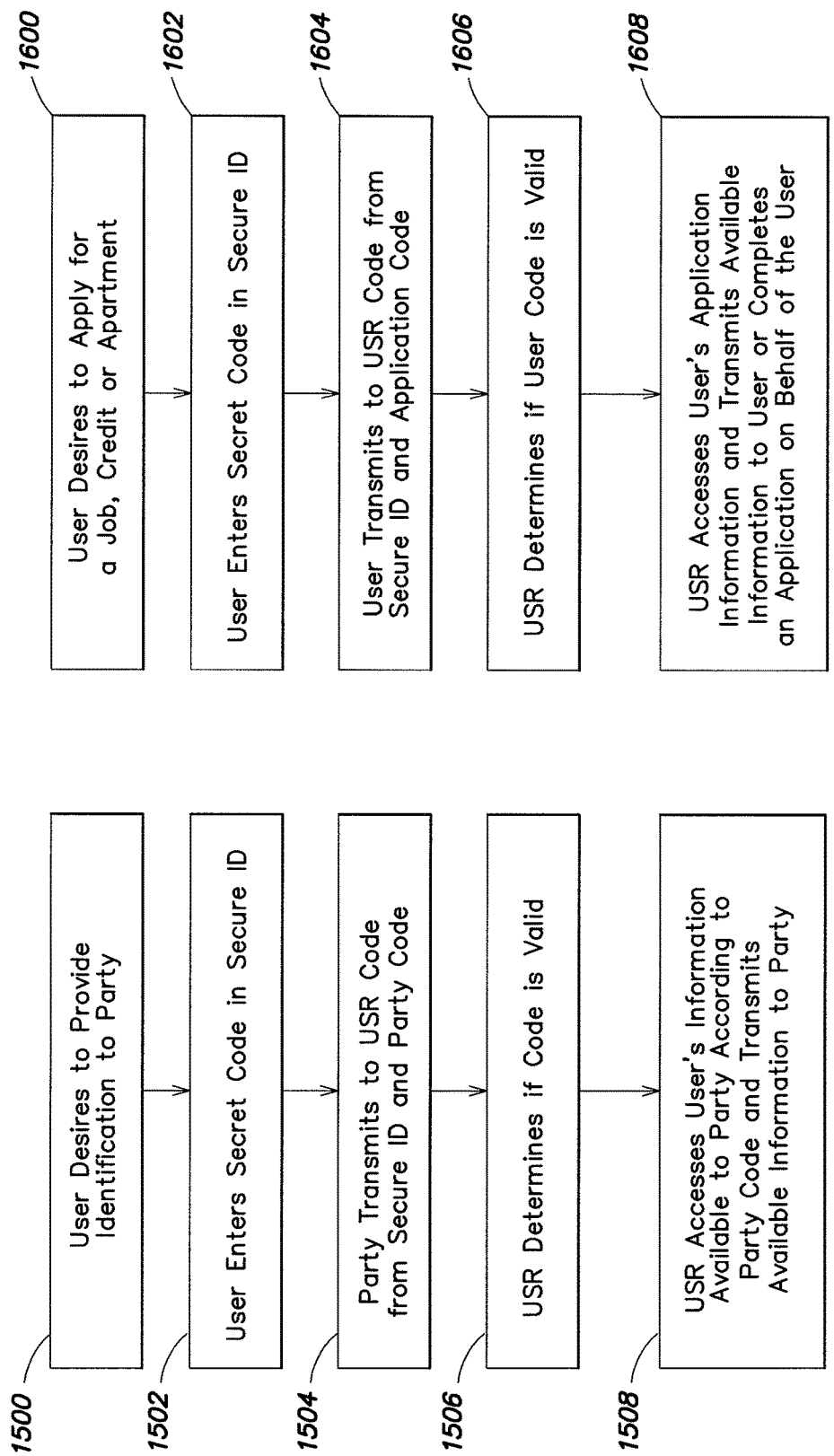

UNIVERSAL SECURE REGISTRY

RELATED APPLICATIONS

This application is a continuation of and also claims priority under 35 U.S.C. § 120 to co-pending U.S. patent application Ser. No. 15/040,873 filed on Feb. 10, 2016, entitled UNIVERSAL SECURE REGISTRY, which is a continuation of and also claims priority under 35 U.S.C. § 120 to co-pending U.S. patent application Ser. No. 14/508,483 filed on Oct. 7, 2014, entitled UNIVERSAL SECURE REGISTRY, which is a continuation of and also claims priority under 35 U.S.C. § 120 to U.S. patent application Ser. No. 11/768,729, filed on Jun. 26, 2007 and issued on Oct. 7, 2014 as U.S. Pat. No. 8,856,539, entitled UNIVERSAL SECURE REGISTRY, which is continuation of U.S. application Ser. No. 09/810,703, filed on Mar. 16, 2001 and issued on Jun. 26, 2007 as U.S. Pat. No. 7,237,117, entitled UNIVERSAL SECURE REGISTRY. Each of the above-identified applications is hereby incorporated herein by reference in its entirety.

BACKGROUND OF INVENTION

1. Field of Invention

This invention generally relates to a method and apparatus for securely storing and disseminating information regarding individuals and, more particularly, to a computer system for authenticating identity or verifying the identity of individuals and other entities seeking access to certain privileges and for selectively granting privileges and providing other services in response to such identifications/verifications.

2. Discussion of Related Art

Dissemination of information regarding various entities, including individuals, in society is conventionally done in a non-centralized fashion, often requiring specialized knowledge of a likely storage location to access the information. This specialized knowledge may not be available when the information is needed, thus effectively preventing distribution of the information when required. For example, a doctor in an emergency room may desire access to a patient's medical history in determining a course of treatment. If the person is not carrying a complete medical record, which is typically the situation, the medical records may not be available to the doctor. Even if these medical records are available electronically, for example via a computer accessible in the person's regular doctor's office, the records may effectively be unavailable if the person is unconscious or otherwise incapacitated or if restrictions on access to the doctor's records cannot otherwise be overcome. The retrieval of required medical records can be further complicated by the fact that such records can be located at a number of different sites/systems which are not linked. For example, the patient's primary care physician may not have records from a specialist treating the patient, and none of these physicians may have dental records. Similar problems arise in other environments where relevant data may be scattered and/or otherwise difficult to access.

Identification of a person from other persons within a society and verification of a person as being who he says he is are extremely important for many reasons. For example, determination/verification of a person's identity will typically dictate extension of credit, granting access to information, allowing entry to a restricted area, or the granting of numerous other privileges.

Most people carry multiple forms of identification. For example, a typical person may carry an identification card issued by a federal, state, or local governmental entity, an identification card issued by a university or place of employment, one or more credit cards that serve to identify the person as a holder of a credit card account, one or more bank cards that serve to identify the person as holder of a bank account, medical information cards identifying the person as a member of, for example, a health maintenance organization or as a person holding an insurance policy from a specified insurance company, keys that identify the person as owner of an automobile, house, etc., and numerous other identification cards that may be used for specialized purposes, such as identifying the person as a member of a health club, a library, or a professional organization.

To enable the person to function effectively in society, the person must typically have one or more of these identification devices with them if they wish to undertake an associated activity. For example, a person is not allowed to drive a car or purchase alcohol without a governmentally issued driver's license. Likewise, although cash may be used to purchase goods and/or services, the person will typically not be able to purchase goods and/or services with a credit card if the person is not physically carrying the credit card. Similarly, most hospitals and other medical facilities will require proof of insurance before rendering medical attention. Carrying these multifarious identification devices can become onerous. Additionally, if one or more of the identification devices is lost, stolen or forgotten, it can be inconvenient, making it difficult to obtain goods or services requiring the missing identification.

There are also times when the individual may wish to be identified or at least verified without providing personal information. For example, a person may wish to purchase goods and/or services without publicly providing his/her credit card information for fear that the credit card information be may be stolen and used fraudulently. Likewise, the person may wish to purchase goods or order goods to be delivered to an address without revealing the address to the vendor. Unfortunately, conventional identification devices require that at least some personal information be transmitted to complete a transaction.

There are other related problems. For example, when there is a need to locate a person or other entity where only limited biographical data is known, this can be difficult since relevant information is seldom available from a single database. Another potential problem is the forwarding of mail, packages, telephone calls/messages, e-mails and other items where a party is in a situation where they are changing location frequently and/or where the person does not want such information to be generally available for security or other reasons. A simple, yet secure, way of dealing with such issues does not currently exist.

Another potential problem is filling in forms, particularly for an individual who frequently has to complete the same or similar form. Such forms can for example be medical forms when visiting a doctor or entering a hospital, immigration forms on entering the country, employment forms, college entry forms, etc. It would be desirable if such forms could be completed once and be available for future use, and it would be even better if the information for each such form could be automatically drawn from an existing database to complete the form. There is also a frequent requirement to periodically update information in a form, for example financial information for a line of credit. It would be desirable if such updates could be automatically performed from data in a general database.

Still another potential problem is that a person may be forced to make requests on a database, for example financial requests, under duress. It would be desirable if the person could easily and undetectably signal such duress when making the request and the receiving system be able to act appropriately to assist and protect the individual.

Systems capable of effectively performing all of these functions do not currently exist.

SUMMARY OF INVENTION

There is thus a need for an identification system that will enable a person to be identified or verified ("identification" sometimes being used hereinafter to mean either identified or verified) and/or authenticated without necessitating the provision of any personal information. Likewise, there is a need for an identification system that will enable a person to be identified universally without requiring the person to carry multiple forms of identification.

Accordingly, this invention relates, in one embodiment, to an information system that may be used as a universal identification system and/or used to selectively provide personal, financial or other information about a person to authorized users. Transactions to and from the database may take place using a public key/private key security system to enable users of the system and the system itself to encrypt transaction information during the transactions. Additionally, the private key/public key security system may be used to allow users to validate their identity and/or sign instructions being sent to a universal secure registry (USR) system of the type to which this invention relates. For example, in one embodiment, a smart card such as the SecurID™ card from RSA Security, Inc. may be provided with the user's private key and the USR system's public key to enable the card to encrypt messages being sent to the USR system and to decrypt messages from the USR system 10.

This USR system or database may be used to identify the person in many situations, and thus may take the place of multiple conventional forms of identification. Additionally, the USR system may enable the user's identity to be confirmed or verified without providing any identifying information about the person to the entity requiring identification. This can be advantageous where the person suspects that providing identifying information may subject the identifying information to usurpation.

Enabling anonymous identification facilitates multiple new forms of transactions. For example, enabling anonymous identification enables the identified person to be telephoned by or receive e-mails from other persons without providing the other person with a telephone number or e-mail address, and will permit this to be accomplished even where there are frequent changes in the person's location. Similarly, enabling anonymous identification will enable the person to receive mail, other delivered parcels and other items without providing the recipient's address information to the sender. By restricting access to particular classes of persons/entities, the person can effectively prevent receipt of junk mail, other unsolicited mail, telemarketing calls and the like.

In a financial context, providing anonymous identification of a person enables the person to purchase goods and/or services from a merchant without ever transmitting to the merchant information, such as the person's credit card number, or even the person's name, that could be intercepted and/or usurped and used in subsequent or additional unauthorized transactions or for other undesired purposes. Enabling anonymous identification may be particularly advantageous in an unsecured environment, such as the Internet, where it has been found to be relatively trivial to intercept such credit card information.

In a medical context, the USR system, in addition to enabling a person seeking medical treatment to identify themselves, may be configured to provide insurance data, medical history data, and other appropriate medical information to a medical provider, once that medical provider has been established as an authorized recipient. The USR system may also contain links to other databases containing portions of the patient's medical records, for example x-rays, MRI pictures, dental records, glasses, prescriptions, etc.

Access to the USR system may be by smart card, such as a SecurID™ card, or any other secure access device. The technology enabling the USR system may be physically embodied as a separate identification device such as a smart ID card, or may be incorporated into another electronic device, such as a cell phone, pager, wrist watch, computer, personal digital assistant such as a Palm Pilot™, key fob, or other commonly available electronic device. The identity of the user possessing the identifying device may be verified at the point of use via any combination of a memorized PIN number or code, biometric identification such as a fingerprint, voice print, signature, iris or facial scan, or DNA analysis, or any other method of identifying the person possessing the device. If desired, the identifying device may also be provided with a picture of the person authorized to use the device to enhance security.

The USR system may be useful for numerous other identification purposes. For example, the USR anonymous identification may serve as a library card, a phone card, a health club card, a professional association membership card, a parking access card, a key for access to one's home, office, car, etc. or any one of a host of similar identification/verification and/or access functions. Additionally, equipment code information may be stored in the USR system and distributed under the user's control and at the user's discretion, to maintain personal property or public property in an operative state.

BRIEF DESCRIPTION OF DRAWINGS

This invention is pointed out with particularity in the appended claims. The above and further advantages of this invention may be better understood by referring to the following description when taken in conjunction with the accompanying drawings. The accompanying drawings are not intended to be drawn to scale. In the drawings, each identical or nearly identical component that is illustrated in various figures is represented by a like numeral. For purposes of clarity, not every component may be labeled in every thawing. In the drawings:

FIG. 13 is a flow chart illustrating a protocol for identifying a person via the USR database;

FIG. 14 is a flow chart illustrating a protocol for identifying a person to a policeman via the USR database;

FIG. 15 is a flow chart illustrating a protocol for providing information to an authorized recipient of the information via the USR database;

FIG. 16 is a flow chart illustrating a protocol for providing application information to an authorized recipient of the information via the USR database.

DETAILED DESCRIPTION

Figure 1:
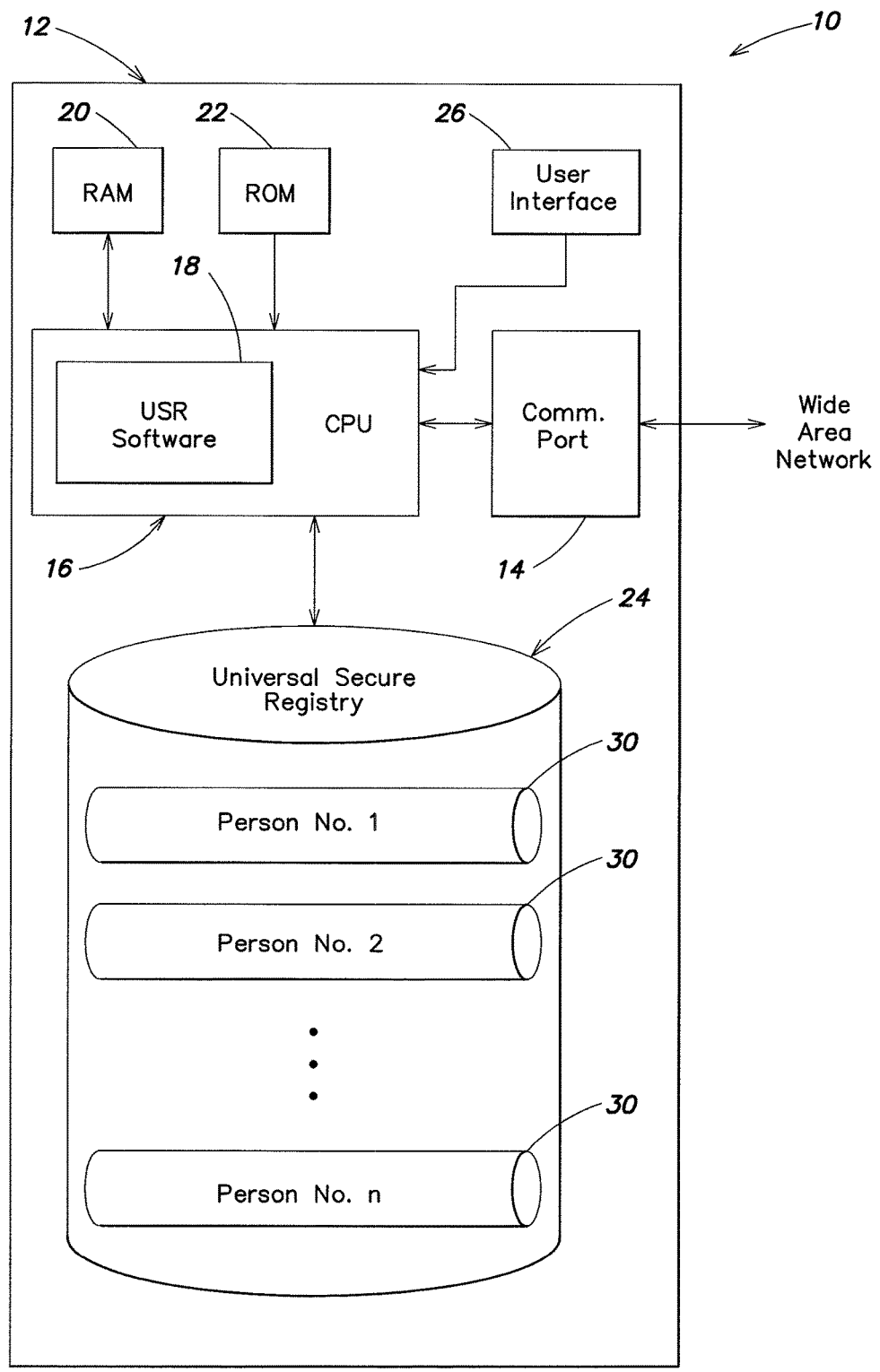
FIG. 1 is a functional block diagram of a computer system configured to implement the universal secure registry ("USR"), including a USR database, according to one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In one embodiment, an information system is formed as a computer program running on a computer or group of computers configured to provide a universal secure registry (USR) system. The computer, in this instance, may be configured to run autonomously (without the intervention of a human operator), or may require intervention or approval for all, a selected subset, or particular classes of transactions. The invention is not limited to the disclosed embodiments, and may take on many different forms depending on the particular requirements of the information system, the type of information being exchanged, and the type of computer equipment employed. An information system according to this invention, may optionally, but need not necessarily, perform functions additional to those described herein, and the invention is not limited to a computer system performing solely the described functions.

In the embodiment shown in FIG. 1, a computer system 10 for implementing a USR system according to the invention includes at least one main unit 12 connected to a wide area network, such as the Internet, via a communications port 14. The main unit 12 may include one or more processors (CPU 16) running USR software 18 configured to implement the USR system functionality discussed in greater detail below. The CPU 16 may be connected to a memory system including one or more memory devices, such as a random access memory system RAM 20, a read only memory system ROM 22, and one or more databases 24. In the illustrated embodiment, the database 24 contains a universal secure registry database. The invention is not limited to this particular manner of storing the USR database. Rather, the USR database may be included in any aspect of the memory system, such as in RAM 20, ROM 22 or disc and may also be separately stored on one or more dedicated data servers.

The computer system may be a general purpose computer system which is programmable using a computer programming language, such as C, C++, Java, or other language, such as a scripting language or even assembly language. The computer system may also be specially programmed, special purpose hardware, an application specific integrated circuit (ASIC) or a hybrid system including both special purpose components and programmed general purpose components.

In a general purpose computer system, the processor is typically a commercially available microprocessor, such as Pentium series processor available from Intel, or other similar commercially available device. Such a microprocessor executes a program called an operating system, such as UNIX, Linux, Windows NT, Windows 95, 98, or 2000, or any other commercially available operating system, which controls the execution of other computer programs and provides scheduling, debugging, input/output control, accounting, compilation, storage assignment, data management, memory management, communication control and related services, and many other functions. The processor and operating system defines a computer platform for which application programs in high-level programming languages are written.

The database 24 may be any kind of database, including a relational database, object-oriented database, unstructured database, or other database. Example relational databases include Oracle 81 from Oracle Corporation of Redwood City, Calif.; Informix Dynamic Server from Informix Software, Inc. of Menlo Park, Calif.; DB2 from International Business Machines of Armonk, N.Y.; and Access from Microsoft Corporation of Redmond, Wash. An example object-oriented database is ObjectStore from Object Design of Burlington, Mass. An example of an unstructured database is Notes from the Lotus Corporation, of Cambridge, Mass. A database also may be constructed using a flat file system, for example by using files with character-delimited fields, such as in early versions of dBASE, now known as Visual dBASE from Inprise Corp. of Scotts Valley, Calif., formerly Borland International Corp.

The main unit 12 may optionally include or be connected to an user interface 26 containing, for example, one or more input and output devices to enable an operator to interface with the USR system 10. Illustrative input devices include a keyboard, keypad, track ball, mouse, pen and tablet, communication device, and data input devices such as voice and other audio and video capture devices. Illustrative output devices include cathode ray tube (CRT) displays, liquid crystal displays (LCD) and other video output devices, printers, communication devices such as modems, storage devices such as a disk or tape, and audio or video output devices. Optionally, the user interface 26 may be omitted, in which case the operator may communicate with the USR system 10 in a networked fashion via the communication port 14. It should be understood that the invention is not limited to any particular manner of interfacing an operator with the USR system.

It also should be understood that the invention is not limited to a particular computer platform, particular processor, or particular high-level programming language. Additionally, the computer system may be a multiprocessor computer system or may include multiple computers connected over a computer network. It further should be understood that each module or step shown in the accompanying figures and the substeps or subparts shown in the remaining figures may correspond to separate modules of a computer program, or may be separate computer programs. Such modules may be operable on separate computers. The data produced by these components may be stored in a memory system or transmitted between computer systems.

Such a system may be implemented in software, hardware, or firmware, or any combination thereof. The various elements of the information system disclosed herein, either individually or in combination, may be implemented as a computer program product, such as USR software 18, tangibly embodied in a machine-readable storage device for execution by the computer processor 16. Various steps of the process may be performed by the computer processor 16 executing the program 18 tangibly embodied on a computer-readable medium to perform functions by operating on input and generating output. Computer programming languages suitable for implementing such a system include procedural programming languages, object-oriented programming languages, and combinations of the two.

Figure 2:
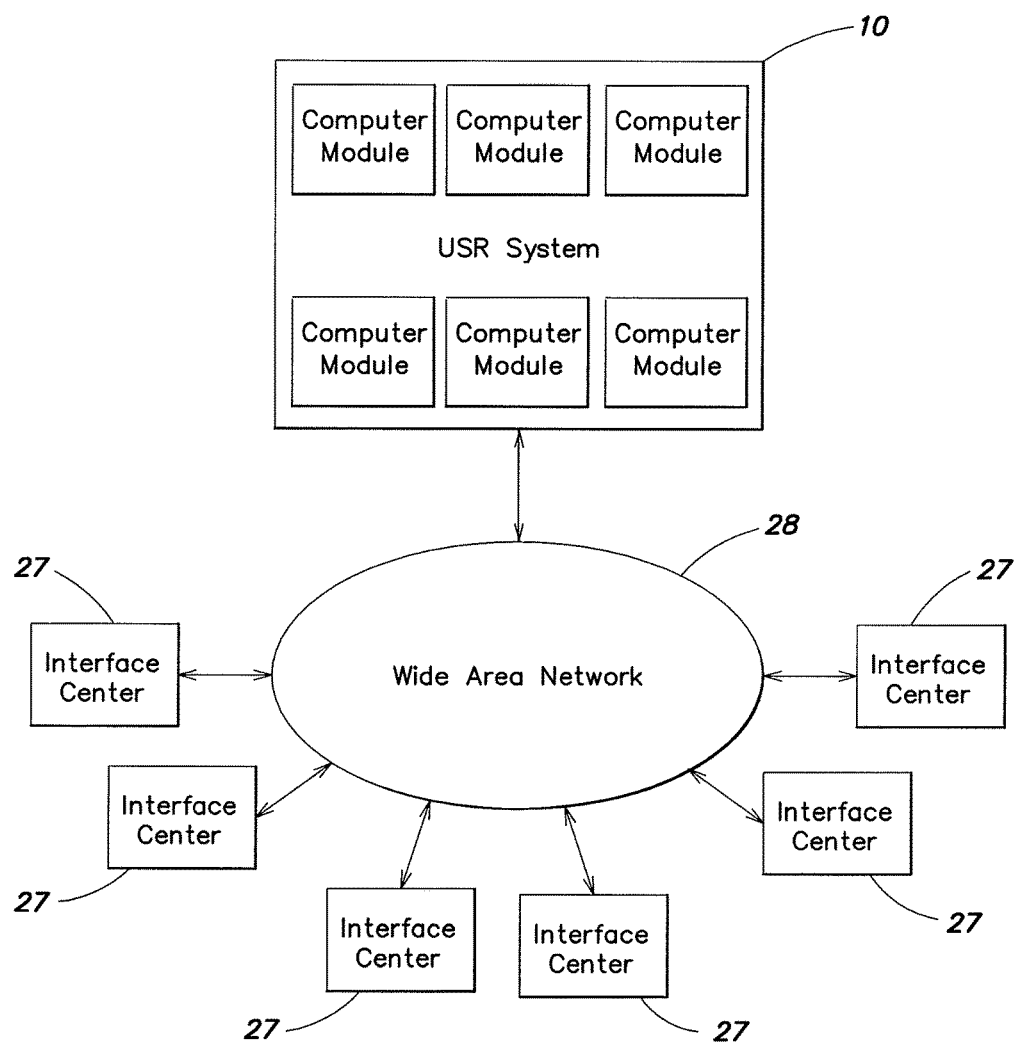
FIG. 2 is a functional block diagram of a first embodiment of a networked environment including the computer system of FIG. 1.

As shown in FIG. 2, the computer system 10 may be connected to a plurality of interface centers 27 over a wide area network 28. The wide area network 28 may be formed from a plurality of dedicated connections between the interface centers 27 and the computer system 10, or may take place, in whole or in part, over a public network such as the Internet. Communication between the interface centers 27 and the computer system 10 may take place according to any protocol, such as TCP/IP, ftp, OFX, or XML, and may include any desired level of interaction between the interface centers 27 and the computer system 10. To enhance security, especially where communication takes place over a publicly accessible network such as the Internet, communications facilitating or relating to transmission of data from/to the USR database 24 or the computer system 10 may be encrypted using an encryption algorithm, such as PGP, DES, or other conventional symmetric or asymmetric encryption algorithm.

In one embodiment, the USR system 10 or USR database 24 may be able to authenticate its identity to a user or other entity accessing the system by providing an appropriate code which may be displayed on the user's smart card, for example a SecurID™ card or its equivalent, or other code generator, for example a single use code generator, being employed by the user. A comparison by the user or the code generator between the provided number and an expected number can validate, to the user (or other entity) or the code generator, that communication is with the database and not an imposter.

Figure 4:
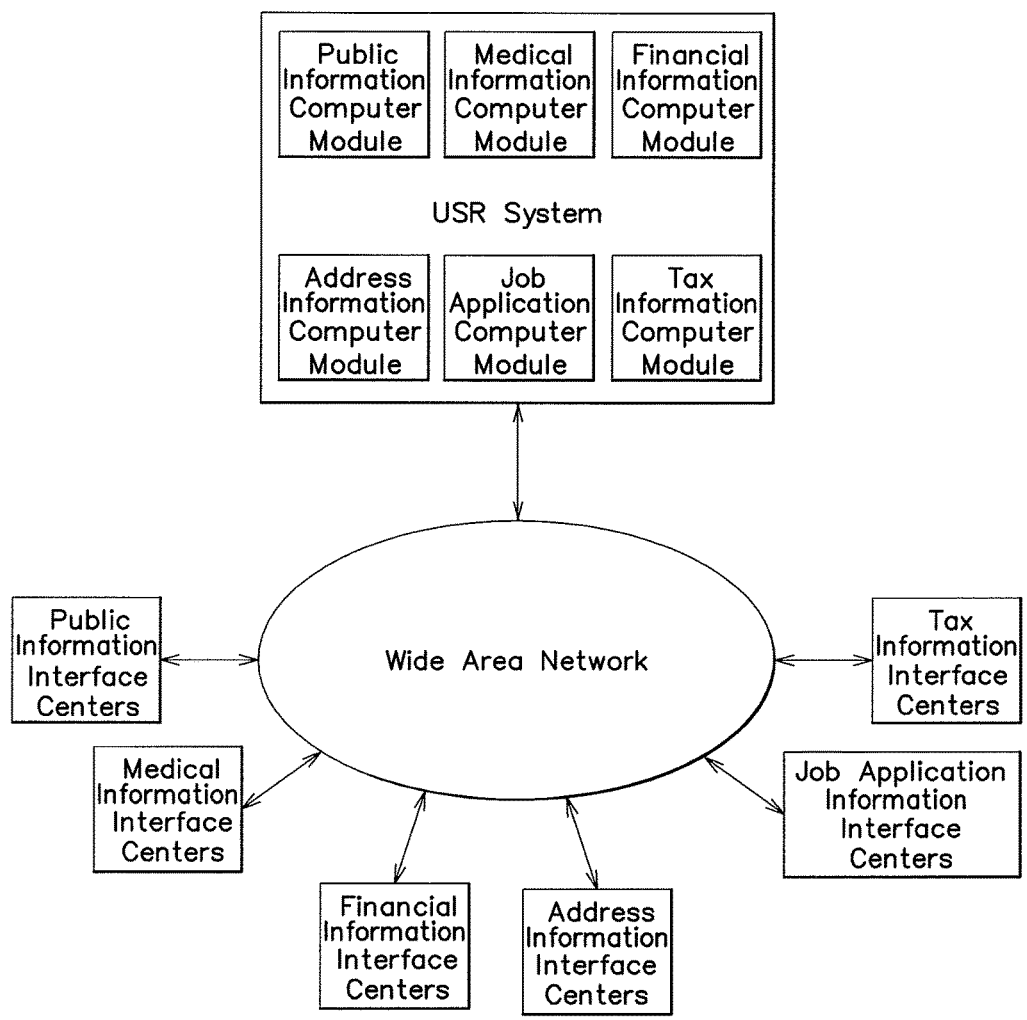
FIG. 4 is a functional block diagram of a second embodiment of a networked environment including the computer system of FIG. 1.

The database 24 shown in FIG. 1 has a USR database containing entries related to persons 1-n. The data in the USR database may also be segregated, as shown in FIG. 4, according to data type to enable individual computer modules to handle discrete applications on discrete data types. Segregating the data, as illustrated in FIG. 4, may make access to the database more robust by enabling portions of the data in the USR database 24 to be accessible even when it is necessary to perform maintenance on a portion of the database. However, storing the data in the USR database 24 according to the scheme illustrated in FIG. 1 may make it easier for a user of the database to make changes to multiple types of data simultaneously or in a single session. There are advantages and disadvantages to each data structure, and the invention is not limited to a particular manner of organizing the data within the database 24, data structures other than the two shown also being possible.

Figure 3:
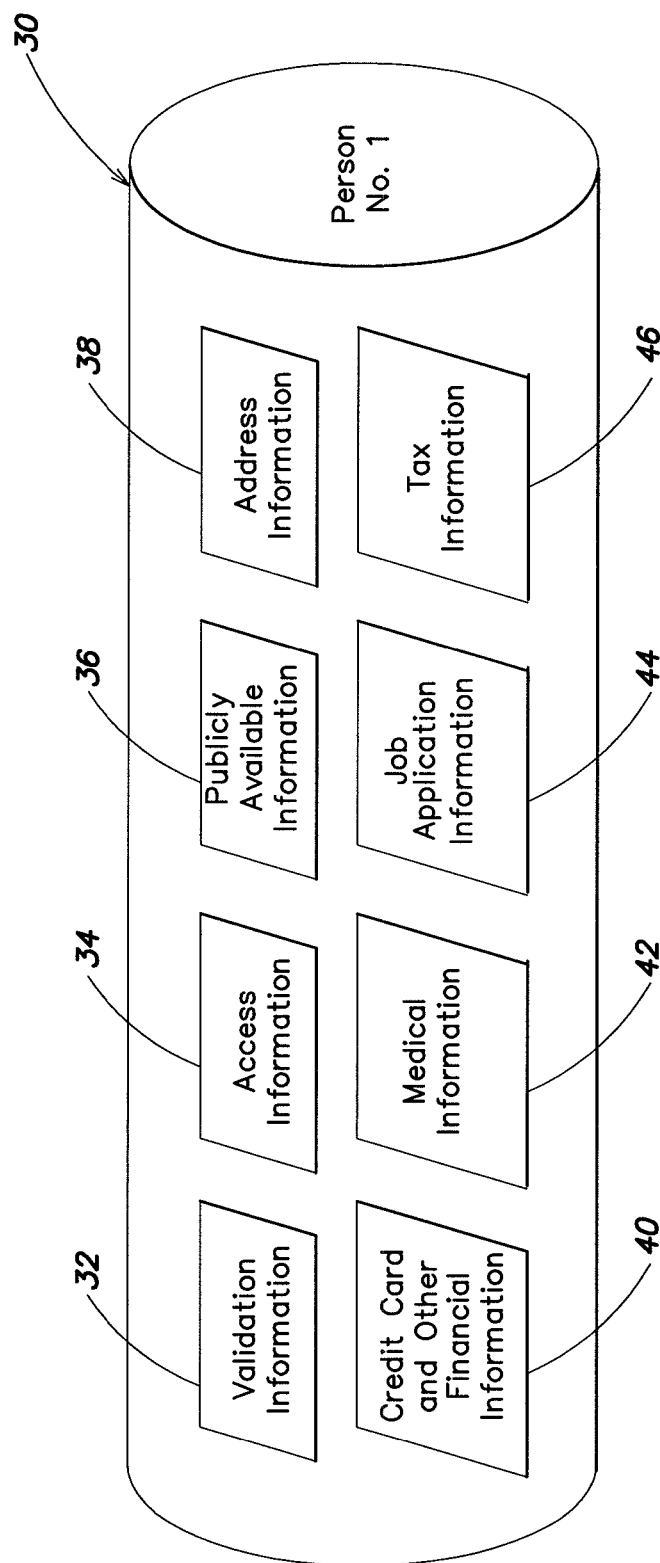
FIG. 3 is a functional block diagram of an entry of a database forming the USR database of FIG. 1.

As shown in FIG. 3, each entry 30 in the database 24 may contain multiple types of information. For example, in the embodiment shown in FIG. 3, the entry contains validation information 32, access information 34, publicly available information 36, address information 38, credit card and other financial information. 40, medical information 42, job application information 44, and tax information 46. The invention is not limited to a USR containing entries with all of this information or only this particular information, as any information on a person or other entity such as a company, institution, etc. may be stored in USR database 24.

If the database information is split between multiple databases, each database will typically include at least the validation and access information to enable the USR software to correlate a validation attempt with a verified validation, and to enable the USR software to determine access privileges to the requested data. Alternatively, databases may be linked to permit information not in a main USR database to be retrieved, with validation/identification for all databases accessed being done at the USR system.

In FIG. 3, the validation information is information about the user of the database to whom the data pertains and is to be used by the USR software 18 to validate that the person attempting to access the information is the person to whom the data pertains or is otherwise authorized to receive it. The validation information may be any type of information that will reliably authenticate the identity of the individual.

In one embodiment, the user of the database will carry a SecurID™ card available from RSA Security, formerly Security Dynamics Technologies, Inc., of Cambridge, Mass. Use of this card enables secure access to the USR database without requiring the user to transmit any personal information. Specifically, to access the USR database, the card retrieves a secret user code and/or time varying value from memory and obtains from the user a secret personal identification code. The card mathematically combines these three numbers using a predetermined algorithm to generate a one-time nonpredictable code which is transmitted to the computer system 10. The computer system, specifically USR software 18, utilizes the received one-time nonpredictable code to determine if the user is authorized access to the USR database and grants access to the USR database if the user is determined to be authorized. The verification information 32 in the database entry in the embodiment of the invention illustrated in FIG. 3 contains information to enable the USR software 18 to validate the user using such a card in this manner.

Alternative types of identification cards or tokens may likewise be used. For example, other smart cards may be used which generate non-predictable single use codes, which may or may not be time varying, or other access code generators may be used. An algorithm generating such non-predictable codes may also be programmed onto a processor on a smart card or other computing device, such as a cell phone, pager, ID badge, wrist watch, computer, personal digital assistant, key fob, or other commonly available electronic device. For convenience, the term "electronic ID device" will be used generically to refer to any type of electronic device that may be used to obtain access to the USR database.

Likewise, various types of biometric information may be stored in the verification area of the database entry to enable the identity of the user possessing the identifying device to be verified at the point of use. Examples of the type of biometric information that may be used in this situation includes a personal identification number (PIN), fingerprint, voice print, signature, iris or facial scan, or DNA analysis. If desired, the verifying section of the database may contain a picture to be transmitted back to the person seeking to validate the device to ensure the person using the device is the correct person. Optionally, the identifying device itself may also be provided with a picture of the person authorized to use the card to provide a facial confirmation of the person's right to use the card.

In FIG. 3, the Access information 34 is provided to enable different levels of security to attach to different types of information stored in the entry 30 in the USR database 14. For example, the person may desire that their address information be made available only to certain classes of people, for example colleagues, friends, family, Federal Express, U.P.S., and the U.S. mail service. The names or universal identifiers for those selected individuals, companies, organizations and/or agencies may be entered into appropriate fields in the Access information to specify to the USR software 18 those individuals to whom the address information may be released. Likewise, access fields may be specified for the other types of information. For example, the individual may specify that only particular individuals and/or companies have access to the credit card and other financial information 40, medical information 42, job application information 44 and tax information 46. Additionally, the individual may specify that no one have access to that information unless the individual participates in the transaction (see FIG. 6).

As shown in FIG. 1, the USR software 18 contains algorithms for execution by the CPU 16 that enables the CPU 16 to perform the methods and functions of the USR software described below in connection with FIGS. 5-16. The USR software 18, in this embodiment, performs all functions associated with validating an electronic ID card. If desired, a separate validation software module may be provided to validate electronic ID devices outside of a firewall segregating the validation information from other user information.

The algorithms comprising the USR software 18 may be used to implement, in one exemplary embodiment, a USR system configured to enable selected information to be disseminated to selected individuals in a secure and dynamic fashion. This information may be used for numerous purposes, several of which are set forth below and discussed in greater detail in connection with FIGS. 5-16.

For example, the USR system may be used to identify the person, enable the person to be contacted by telephone or mail anonymously, enable the person to be contacted by telephone or by mail without revealing the person's telephone number or present location, enable the person to purchase items over the Internet or in a store without revealing to the merchant any personal identification information or credit card information, enable the person to complete a job application without completing a job application form, enable the police to discern the person's identity and any outstanding warrants on the individual, and numerous other uses. The invention is not limited to these several enumerated uses, but rather extends to any use of the USR database. The methods of using the USR database 24 will now be discussed in connection with FIGS. 5-16.

Figure 5:
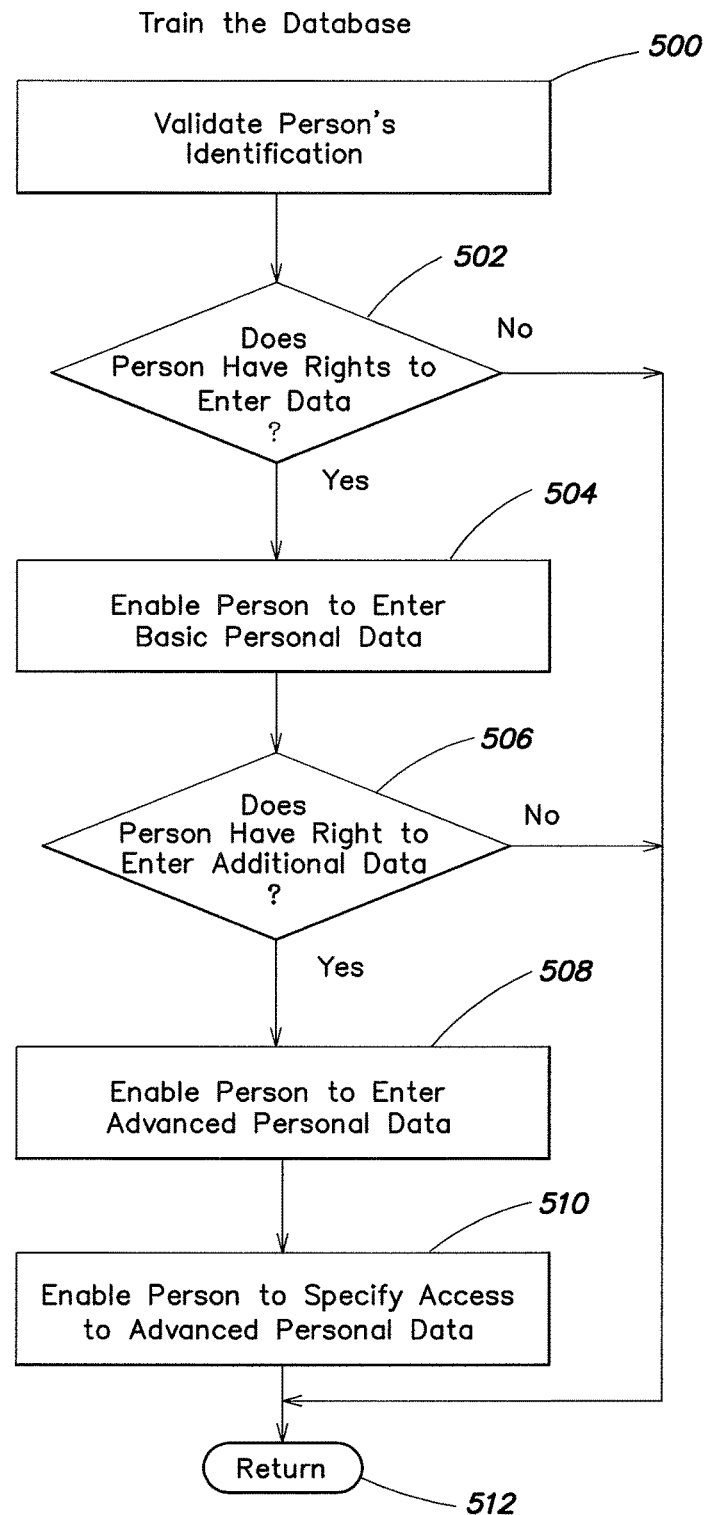
FIG. 5 is a flow chart illustrating steps in a process of inputting data into the USR database.

FIG. 5 illustrates a method of training the USR database 24. As shown in FIG. 5, the USR software 18 first validates the person's identification (500). The initial validation of the person's identification (500) may take place at the point of sale of an electronic ID device (for example, a smart card). This may be done in any conventional manner, such as by requiring the person to show a government issued identification card, passport, birth certificate, etc. Once the person's electronic ID device has been issued and initially validated, the validation process proceeds as discussed above.

After the validation process (500), the USR software 18 determines if the person has rights to enter data into the system (502). This step enables the system to charge persons for maintaining information in the USR database 24. For example, the USR software 18 may poll a database of current accounts or a database of accounts that are currently in default to determine if the person has paid the access fee to enter data into the database. A similar account status inquiry process may be performed by the USR software 18 in connection with each of the other methods set forth in FIGS. 6-16. If the person is not authorized to enter data into the USR database 24, the person is notified of the status of their account and the process returns (512) to wait for further input from another person. Alternatively, a person may be permitted to enter some classes of data into the system and update such classes of data at no charge, with a fee possibly being required for other classes of data, for example medical records. This would facilitate a more robust database.

If the person is authorized, the USR software 18 then enables the person to enter basic personal data into the USR database 24 (504). Optionally, personal data may be one class of data the USR software 18 allows the person to enter into the USR database 18 regardless of account status, i.e., for free.

The USR software 18 will then check to see if the person has additional rights to enter additional data (506), such as data to be entered into one of the other categories of data in FIG. 3. Optionally, this step of checking the person's rights to enter data (506) may be combined with the initial check (502). If the person does not have rights to enter any further data, the USR software 18 notifies the user and returns (512).

If the USR software 18 determines that the person has the right to enter additional data into the USR database 24, the person is prompted through the use of appropriate prompts, provided with forms, and otherwise enabled to enter advanced personal data into the USR database 24 (508). For each type of data entered, the person is asked to specify the type of access restrictions and/or whom should be allowed to access the advanced personal data (510). When the person has completed entering data into the database, the process returns (512) and commits the data to the database.

In the situation where only one person has access to enter and/or modify data for a given person in the database, there should be no conflict with committing data to the database. If, however, multiple people have access to a given account to modify data, the database may perform an integrity check to ensure the absence of conflict in the data before committing the new data to the database.

Figure 6:
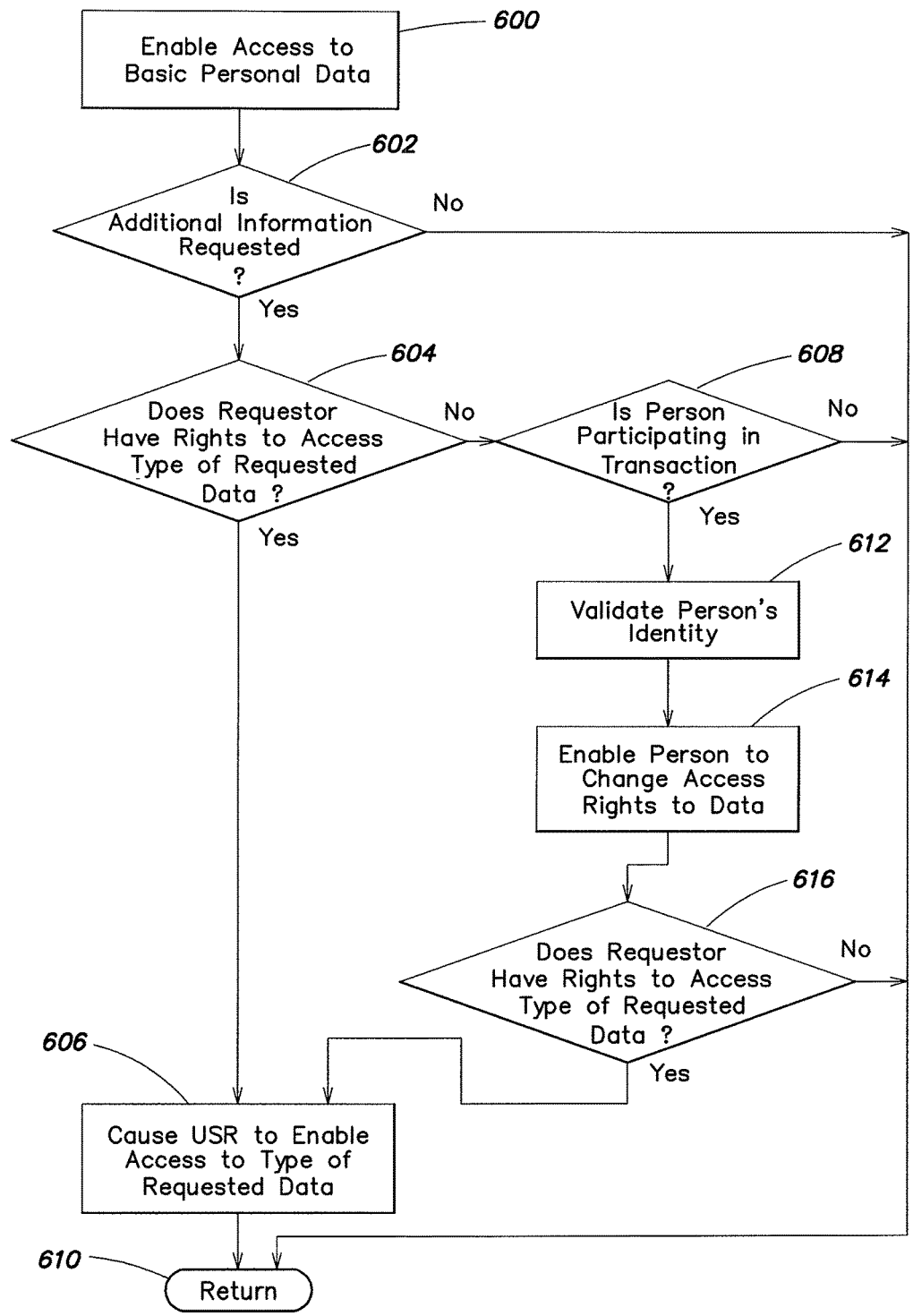
FIG. 6 is a flow chart illustrating steps in a process of retrieving data from the USR database.

Enabling access to the information in the database will be explained in greater detail in connection with FIG. 6. As shown in FIG. 6, the database will generally allow anyone to access basic personal data on anyone without performing any authorization check (600).

If information beyond that specified in the basic personal information area is requested, the USR software 18 queries whether the requestor has the right to access the type of requested data (602). The process of determining the requestor's rights (602) typically involves validating the requestor's identity and correlating the identity, the requested information and the access information 34 provided by the person to the USR database during the training process described above with respect to FIG. 5.

If the USR software 18 determines that the requestor has rights to access the type of requested data (604), the USR software 18 instructs the USR database 24 to enable access to the type of requested data (606). The actual step of enabling access to the type of requested data may involve multiple steps of formulating a database query, querying the USR database 24, retrieving the results, assembling the results into a user friendly or user readable format, and transmitting the information to the user.

If the USR software 18 determines that the requestor does not have the appropriate rights to access the type of requested data (604), the USR software 18 checks to see if the person is participating in the transaction (608). Checking to see if the person is participating in the transaction enables the user to authorize access to the requested data in real time. For example, a person may wish to participate in a transaction to give a potential employer one-time access to job application information 44 (see FIG. 3). If the person is not participating in the transaction, the USR software 18 determines that the requestor is not authorized to have access to the requested data, notifies the requestor of this determination, and ends (610).

If the person is participating in the transaction (608), however, the USR software 18 validates the person's identity (612) and enables the person to change access rights to the data (614). If the USR software 18 is not able to validate the person's identity, the USR software 18 refuses to allow the person to update the database, notifies the person and/or requestor of this determination, and returns (610).

It is also possible that a person may be required to grant access to certain data, for example financial data such as account numbers, under duress. The system may provide the person with the ability to safely signal this when accessing the system by using a selected access code or by making a known modification to the access code provided by the electronic ID device. On receiving such code, the system would take appropriate steps to protect the person, including for example alerting the police, tracking the person's location to the extent possible, providing traceable data, and the like.

Once the person has had the opportunity to change access rights to the data (614), the USR software 18 again checks to see if the requestor has rights to access the type of requested data (616). Although step 616 may seem redundant, given the fact that the person is participating in the transaction and has just previously changed access rights to the database to enable the requestor to have access to the data, step 616 is actually useful at preventing a different type of fraud. Specifically, the requestor may not be forthright with the person regarding the type of information they are requesting. If step 616 were omitted, the USR software 18 may inadvertently allow access to an unauthorized type of information in the situation where the requestor has surreptitiously requested multiple types of data.

If the USR software 18 determines that the requestor has rights to the type of data requested (616), it causes the USR database to enable access to the type of requested data (606). Otherwise, it notifies the requestor of the decision to deny access to the requested data and returns (610).

Various applications of the USR database 24 and USR software 18 will now be discussed in connection with FIGS. 7-16. These applications are merely exemplary of the types of applications enabled by the USR software 18 and USR database 24, and the invention is not limited to these particular applications.

Figure 7:
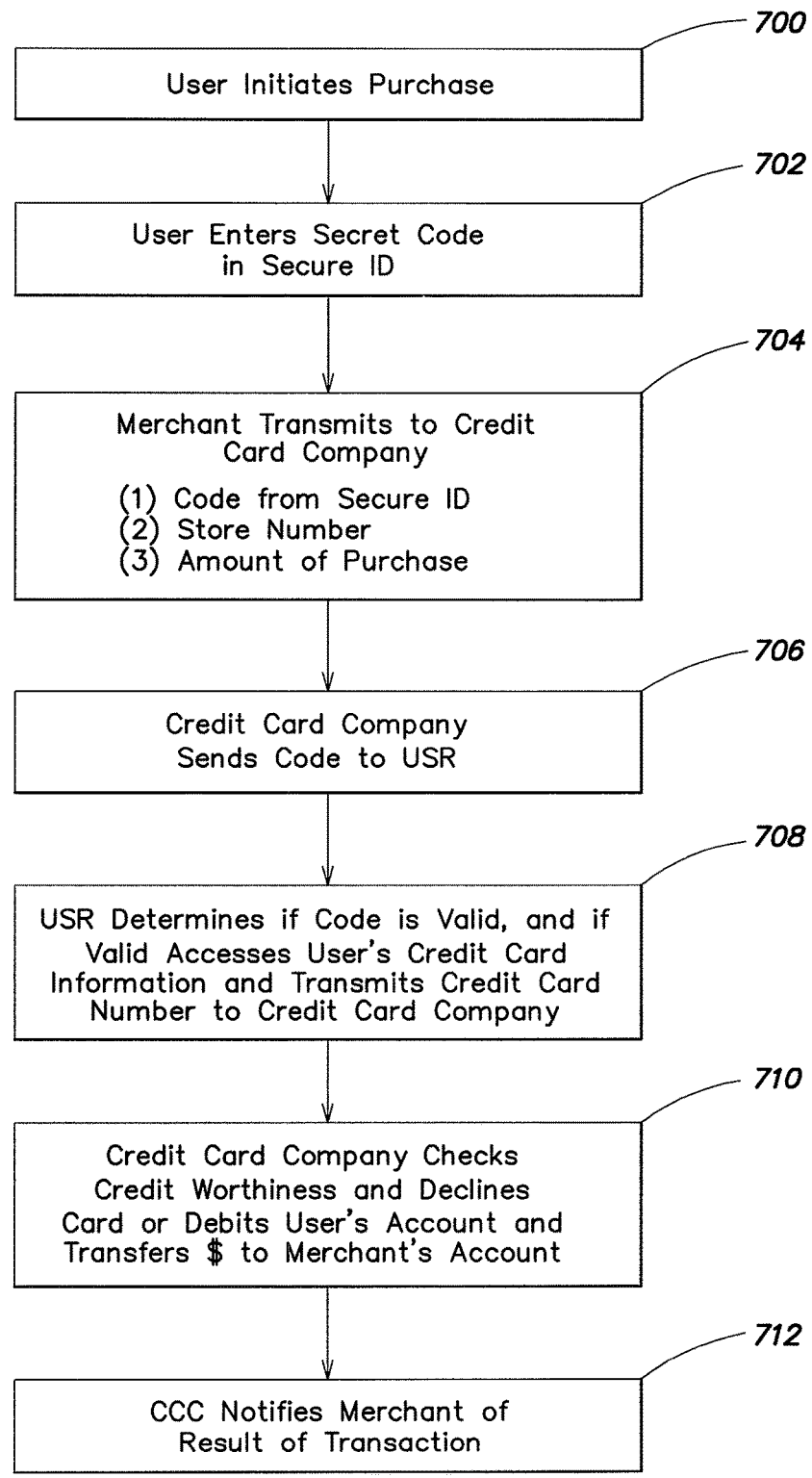
FIG. 7 is a flow chart illustrating a first protocol for purchasing goods from a merchant via the USR database without transmitting credit card information to the merchant.

FIG. 7 illustrates one embodiment of a method of using the USR software 18 and USR database 24 to purchase goods or services from a merchant without revealing to the merchant account information relating to the person's bank or credit card.

As shown in FIG. 7, when a user initiates a purchase (700), the user enters a secret code in the user's electronic ID device (702) to cause the ID device to generate a onetime code or other appropriate code, and presents the electronic ID device with the code to the merchant or otherwise presents the code to the merchant. The merchant transmits to the credit card company (1) the code from the electronic ID device, (2) the store number, (3) the amount of the purchase (704), and the time of receipt of the code. The credit card company takes this information and passes the code from the electronic ID device to the USR software 18 (706). The USR software 18 determines if the code is valid, or was valid at the time offered, and if valid accesses the user's credit card information and transmits the appropriate credit card number to the credit card company (708). While the link between the USR system and the credit card system is a secure link, there is always a danger that the link may be penetrated and credit card numbers obtained. This may be avoided by instead transmitting, on approval, a multidigit public ID code for the credit card holder which the credit card company can map to the correct credit card number. Even if the link is violated, the public ID code is of no value and the secure link prevents this code from being improperly sent to the credit card company. The credit card company checks the credit worthiness of the user and declines the card or debits the user's account in accordance with its standard transaction processing system (710). The credit card company then notifies the merchant of the result of the transaction (712). In this embodiment, the user has been able to purchase goods or services from a merchant without ever providing to the merchant the credit card number. Since the electronic ID device generates a time variant code or otherwise generates a code that can for example only be used for a single transaction, the merchant retains no information from the transaction that may be fraudulently used in subsequent transactions.

Figure 8:
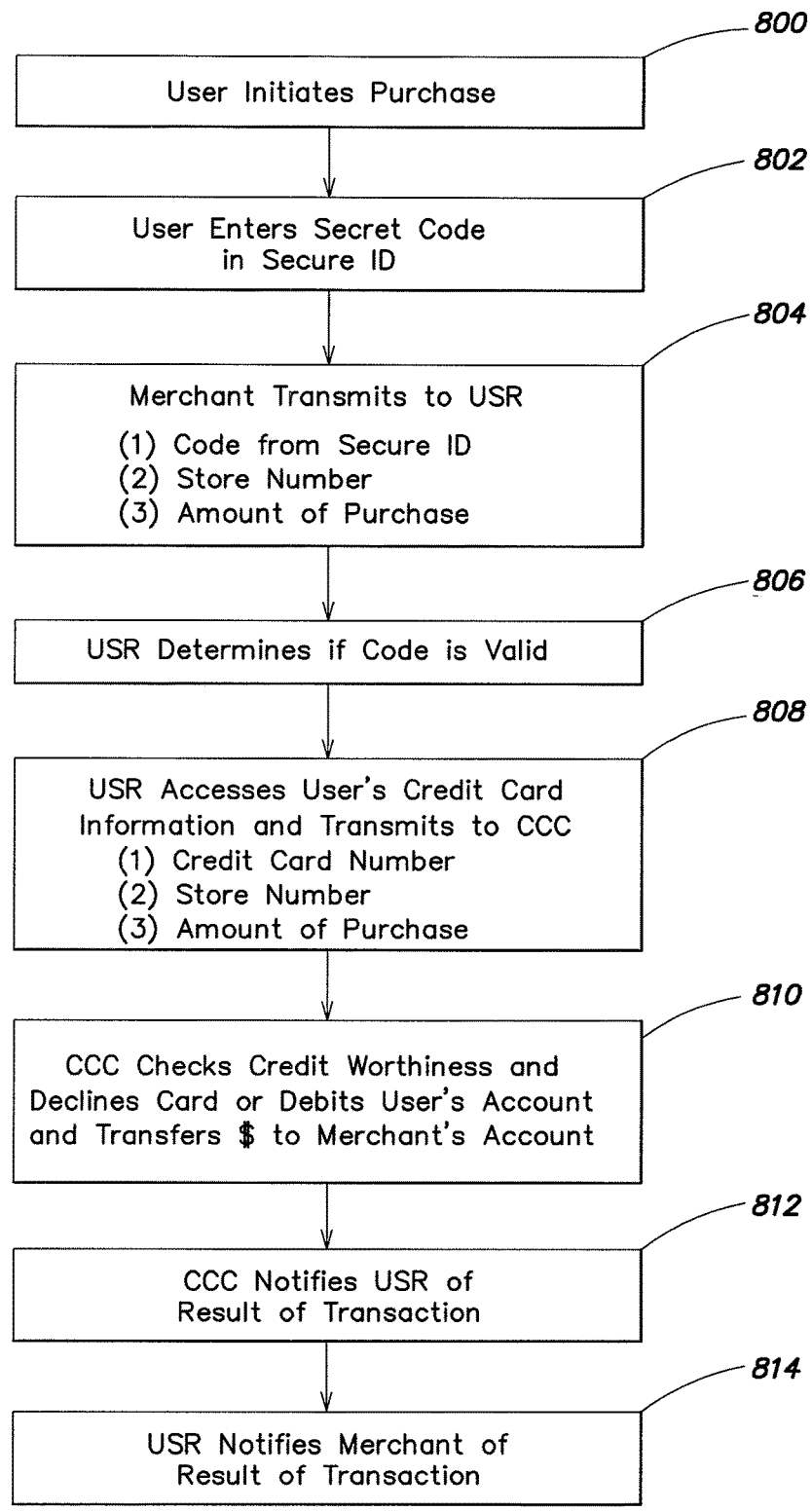
FIG. 8 is a flow chart illustrating a second protocol for purchasing goods from a merchant via the USR database without transmitting credit card information to the merchant.

Another embodiment of a system for facilitating purchase of goods or services without providing financial information to the merchant is set forth in FIG. 8. In FIG. 8, like FIG. 7, the user initiates a purchase (800), enters a secret code in the electronic ID device (802) and presents the resultant code to the merchant. The merchant, in this embodiment, transmits to the USR software 18, (1) the code from the electronic ID, (2) the store number, and (3) the amount of the purchase (804). The USR software 18 determines if the code is valid (806) and, if valid, accesses from the USR database 24 the user's credit card information (808). The USR software then transmits to the credit card company (1) the credit card number, (2) the store number, and (3) the amount of purchase (808). The information in this embodiment transmitted to the credit card company is intended to be in a format recognizable to the credit card company. Accordingly, the invention is not limited to transferring from the USR system 10 to the credit card company the enumerated information, but rather encompasses any transfer of information that will enable the use of the USR system 10 to appear transparent to the credit card company.

The credit card company then processes the transaction in a standard fashion, such as by checking the credit worthiness of the person, declining the card or debiting the user's account and transferring money to the merchant's account (810). The credit card company then notifies the USR system 10 the result of the transaction (812) and the USR software 18 in turn notifies the merchant of the result of the transaction (814).

In this embodiment, like the embodiment of FIG. 7, the user can use the USR system 10 to purchase goods or services from a merchant without providing the merchant with the user's credit card number. In the embodiment of FIG. 8, the interposition of the USR system 10 between the merchant and the credit card company is transparent to the credit card company and thus requires no or minimal cooperation from the credit card company to implement.

Figure 9:
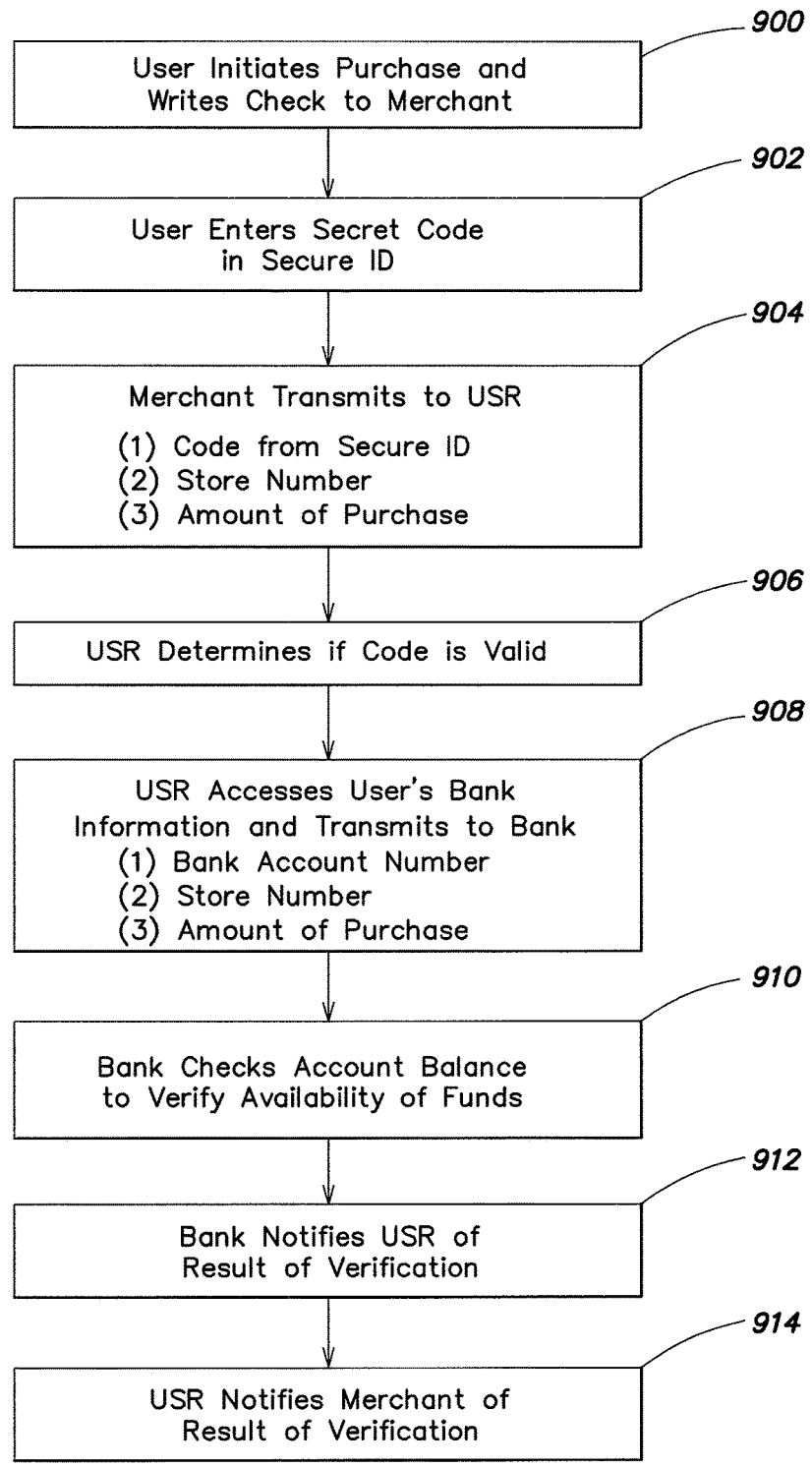
FIG. 9 is a flow chart illustrating a protocol for purchasing goods from a merchant via the USR database by validating the user's check.

FIG. 9 illustrates one embodiment of a method of using the USR system 10 to verify funds when using a check to purchase goods or services from a merchant. In the embodiment of FIG. 9, the user initiates a purchase and writes a check to the merchant (900). The check may be a conventional check containing identifying information, or may be a check bearing a unique serial number and no identifying information to enable the check to be used anonymously.

In either situation, the user enters a secret code into the electronic ID card and presents the resulting code to the merchant along with the check (902). The merchant transmits to the USR software 18 (1) the code from the electronic ID card, (2) the store number, and (3) the amount of the purchase (904). Where the check is an anonymous check, the merchant also transmits to the USR software 18 the check number.

The USR software 18 then determines if the code from the electronic ID is valid (906), and if valid accesses the user's bank information and transmits to the bank: (1) the user's bank account number, (2) the store number, and (3) the amount of the purchase (908). Optionally, the USR software 18 may additionally inform the bank of the check number.

The bank polls its own database to determine if there are sufficient funds in the user's account (910) and notifies the USR software 18 of the result (912). The USR software 18 then, in turn, notifies the merchant of the result of the verification (914).

This check verification system may take place over an unsecured connection between the merchant and the USR system 10 since the user's bank account information is not sent over the connection between the merchant and the USR system 10. Moreover, where an anonymous check is used, the merchant is not even provided with the person's name or account information in written form. This provides additional security against unauthorized persons writing subsequent checks.

The check verification system may be conducted over a telephone network, such as by having the merchant call a toll free number, or over a network connection such as over the Internet.

Figure 10:
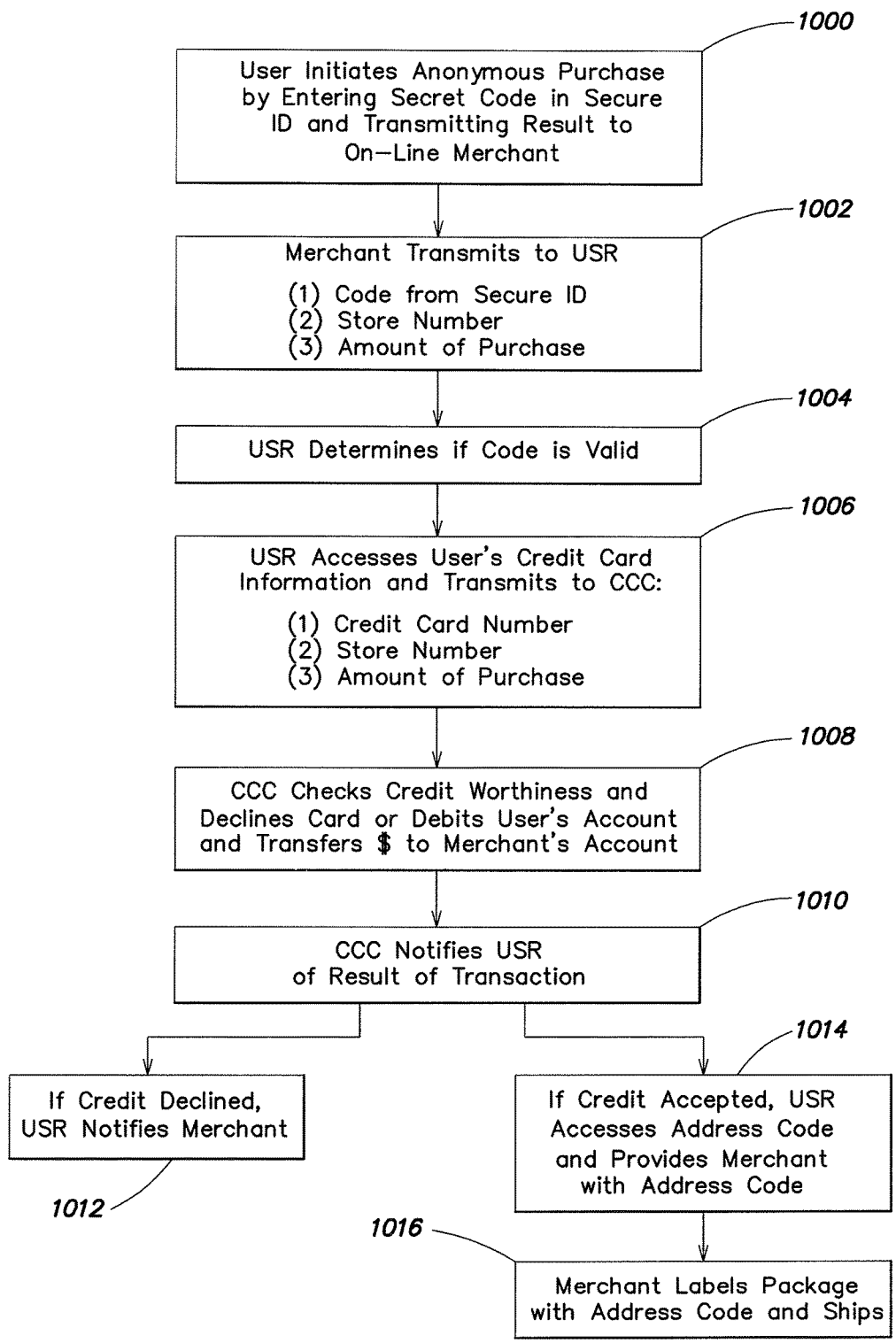
FIG. 10 is a flow chart illustrating a protocol for purchasing goods from an on-line merchant via the USR database without transmitting credit card information to the on-line merchant, and enabling the on-line merchant to ship the goods to a virtual address.

FIG. 10 illustrates a method of conducting a transaction with a merchant without requiring the user to provide to the merchant the user's name, address, or other identifying information, while enabling the merchant to ship the goods to the user. This may be beneficially employed, for example, in connection with transactions that take place between remote parties in a networked environment, such as the Internet.

As shown in FIG. 10, the user initiates an anonymous purchase by entering a secret code into the electronic ID device and transmitting the result to the on-line merchant (1000). The merchant transmits this information to the USR software 18, along with the store number and the amount of the purchase (1002). Optionally, the merchant may provide the store number and purchase price to the user and the user may send this information directly to the USR software 18 along with the code from the electronic ID. Where the number from the electronic ID device is a time varying number, the merchant may also need to input the time the number was received. Alternatively, the electronic ID device may encode or encrypt the time with the number, the USR software being able to extract time when receiving the number from the merchant. This may not be required where the time varying number varies slowly, for example changing every hour rather then every minute as for some existing such devices.

In either event, the USR software 18 determines if the code is valid (1004) and, if valid, accesses the user's credit card information from the USR database 24 (1006). The USR software 18 then contacts the user's credit card company, as described above in connection with FIG. 8 (1008) and notifies the USR software 18 of the result (1000).

If the user's credit is declined, the USR software 18 notifies the on-line merchant and the transaction is terminated (1012). If the user's credit is honored, the USR software 18 polls the USR database 24 for the user's address and/or address code (1014). Address codes are discussed below in greater detail with reference to FIG. 11. The merchant then packages the goods into a parcel, labels the parcel with the appropriate address and/or address code and ships the parcel to the user (1016). Having the USR system 10 provide the address and/or address code to the on-line merchant enables the user to purchase items in a networked environment without requiring the user to input address information in connection with every sale.

Figure 11:
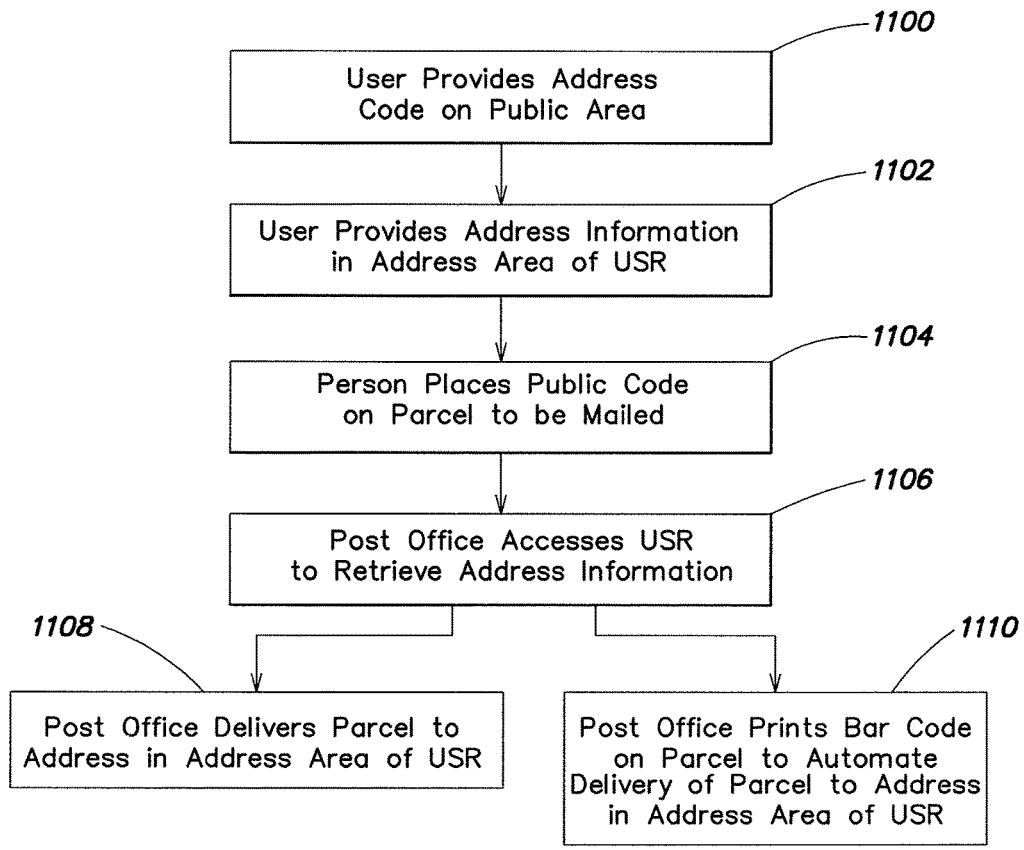
FIG. 11 is a flow chart illustrating a protocol for shipping goods to a virtual address via the USR database.

FIG. 11 illustrates a use of the USR database 24 to deliver mail to a user without requiring the user to provide address information to the sender. This may be useful in many contexts. For example, the user may wish that the address information be known only by the post office. In this instance, using the USR database 24 according to the method of the invention described below, will enable the user to receive parcels without requiring the user to provide the merchant with the address information. Additionally, the user's address may change, temporarily, permanently, or frequently. Enabling the sender to send mail by entering a code instead of an address enables the post office to effectively deliver the coded mail to the corresponding address regardless of the frequency with which the address changes or the duration in which the address will remain valid.

In FIG. 11, the user provides an address code on a public area of the USR database 24 that is available to all persons to see (1100). This code may for example be six alpha characters, which should be adequate for currently anticipated system populations. Optionally, the user may provide this code directly to a merchant or other person desirous of sending the person one or more parcels.

The user also provides address information to the address information area 38 of the user's entry in the USR database 24 (1102). Access to the address information 38 is restricted by a rule or other appropriate entry in the access information 34 of the user's entry to only permit mail, parcel or other material delivery services, such as the US mail, UPS and Fed Ex to access the address information.

When someone wishes to have a parcel or other items delivered to the user, the sender retrieves the user's address code from the USR database 24 or otherwise receives the address code from the user, and prints the address code on the parcel (1104).

The delivery service accesses the USR software 18, validates its identity, and queries the USR database 24 for address information corresponding to the address code (1106). The USR database 24 retrieves the appropriate address data and provides the address information to the delivery service. The delivery service then either prints out an address label, prints a machine readable bar code to be attached to the package, or correlates an entry in a delivery database between the address code and the user address (1110). The delivery service then uses this retrieved information to deliver the package to the user while never supplying the merchant with the user's permanent or temporary address. A user may also assure that mail, parcels, etc. are delivered to a current location by providing only a single notice to the USR system, regardless of how frequently the person moves. The person can also automatically provide for address changes where the person moves according to a known schedule. Thus, deliveries to be made on a weekday could be directed to one address and deliveries on a weekend to another address; or deliveries during winter months to one address and during summer months to a different address.

Figure 12:
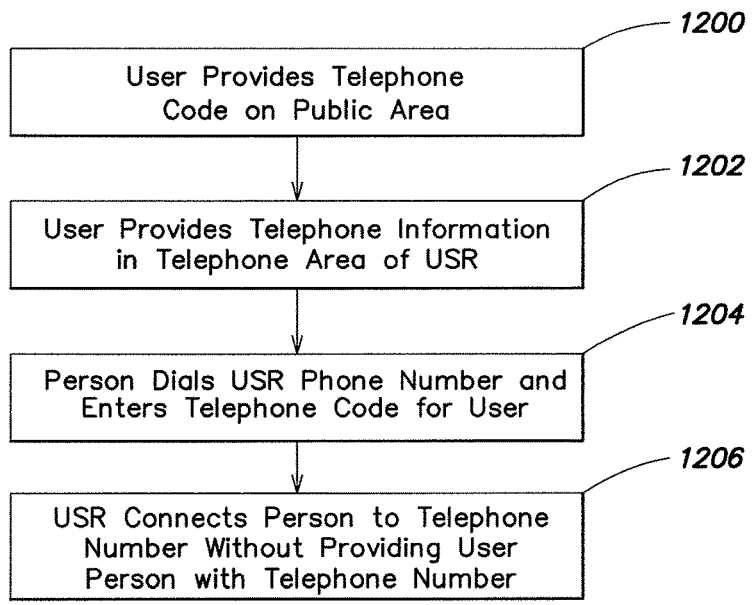
FIG. 12 is a flow chart illustrating a protocol for telephoning a virtual phone number via the USR database.

FIG. 12 illustrates a method of enabling a person to telephone a user of the USR system 10 without providing the user's telephone number to the person. In the embodiment illustrated in FIG. 12, the user provides a telephone code on the publicly available area of his entry on the USR database 24 (1200). This code may be assigned by the USR software 18 or made up by the user. The user also provides the USR database 24 with actual telephone information to enable the USR system 10 to connect callers with the user (1202).

The person wishing to telephone the user of the USR system 10 calls a telephone number and enters the telephone code of the user (1204). The USR software 18, optionally, may require the person to identify themselves to see if they are authorized to call the user. Assuming that the person is authorized to call the person, or if no authorization check is performed, the USR connects the person to the telephone number in the USR database 24 without providing the person with the telephone number.

Enabling the user to specify the telephone number may be advantageous for many reasons. First, the user may frequently be switching between telephone coverage areas and may wish to be reachable at all times. Simply by instructing the USR database 24 to connect incoming telephone calls to one of a myriad of numbers will facilitate connecting the incoming calls to, for example, the user's cell phone, work phone, pager, car phone or home phone, without necessitating the user to provide all these numbers to the caller. A similar system may be implemented for facsimile transmissions, e-mails or other communications.

The user also may have predefined rules to enable telephone calls to follow a set pattern. For example, the user may desire to receive telephone calls only from family members during the night time at home, may wish to have all incoming calls routed to a car phone during commuting hours, and may wish to have all incoming calls routed to a cell phone during lunch. These time dependent rules may and/or caller specific rules may be entered into the USR database to specify accessibility and connectivity of incoming telephone calls.

The publicly available address code and telephone code and any other codes may be the same, or may be different, there being some advantages to having a single code usable for all such applications for each person on the system. The codes could be accessible through a variety of media including telephone and the internet. Where two or more people on the system have the same name, which will frequently be the case, additional publicly available biographical data may be provided with the name to assure that the right code is selected. The system may similarly be used to provide public keys for use in a public key/private key encryption system, to provide other public codes for an individual or to provide other public information. Access to such information would typically be unrestricted.

Where the system is used to provide public keys, the public code used to obtain the key, or possibly the public key itself, may be used as above to obtain the e-mail address, telephone number or the like for the person to whom the message is being sent, and the USR system may also be used to perform the encryption. When the recipient receives the message, he deencrypts it using the recipient's private key in standard fashion, including deencrypting the name of the sender. However, this does not necessarily verify the sender and such verification may be desirable for important messages, particularly ones involving large financial transactions. The USR system may accomplish such verification by also storing private keys for people in the system. The sender first authenticates himself to the system, and the system then adds a second signature to the message which is encrypted with the sender's private key. The receiving party deencrypts this signature with the sender's public key. Since the system only sends such signatures for authenticated users, the message is thus verified.

FIG. 13 illustrates a general method of using the USR database 24 to authenticate a user's identification. This may be used in connection with any of the other methods disclosed herein to ensure that the electronic ID device has not been stolen and/or hacked by an unauthorized holder.

Specifically, in the embodiment illustrated in FIG. 13, the user attempts to prove identification to a validator, such as to prove that the possessor of the electronic ID device is of sufficient age to purchase alcohol (1300). In connection with this attempt, the user enters a secret code into the electronic ID (1302). The validator transmits to the USR software 18 the code from the electronic ID (1304). If the USR software 18 determines that the code is valid (1306), it accesses the user's photograph, age information, or any other desired information, and transmits that information to the validator (1308). By transmitting back to the validator a picture of the person to whom the electronic ID card was issued, the validator can ensure that the person using the electronic ID card is the proper person. Likewise, the validator can ensure, based on the information provided by the USR system 10, that the person is as old as the person claims to be.

A specific embodiment of this identification validation procedure is illustrated in FIG. 14. In FIG. 14, a policeman takes the place of the validator. In this scenario, however, instead of simply transmitting to the policeman a validation of the user's identity, such as their picture, the policeman may also receive additional information, such as the user's police records, records of any arrests, outstanding warrants, and other similar information that may be of use to the policeman when determining how to handle a particular individual.

FIG. 15 illustrates a process for enabling the user to provide specific information to a party, such as medical staff in an emergency room. As shown in FIG. 15, if the user desires to provide information to a party (1500), the user enters a secret code in the electronic ID device and provides the electronic ID code to the party (1502). The party transmits to the USR software 18 the ID code and the party code (1504). The party code may be a code from for example an electronic device which identifies the party, may be a status code which identifies the class of users to which the party belongs, for example policeman, emergency room personnel, doctor, etc. or may be a combination of both, the status code for example being encrypted into the ID code. The USR software 18 determines if the code is valid (1506), accesses the user's information in the USR database 24 and transmits available information to the party (1508). In this scenario, the user may be provided with a plurality of different codes to enter into the electronic ID device depending on the type of information to be released to the party. For example, the user's basic code may be 1234. The fifth digit of the electronic code may specify the type of information to be provided, i.e., 1=address information, 2=medical information; 3=telephone information, 4=job application information, etc. Using multiple codes eliminates any ambiguity about the authority provided by the user to the party, but requires the user to remember additional information.

The above assumes the user is able to provide an ID code when the information is required. However, in for example an emergency room situation, the user may not be in a position to provide the ID code, but would still want medical records provided. The release authorization for certain portions of the user's database could therefore specify that the information be released to certain class or classes of individuals and the USR system would release such information to individuals or organizations based only on status code. Thus, the status code of an emergency room could alone trigger release of medical data.

FIG. 16 illustrates one embodiment of a method of using the USR database 24 to complete a standard application, such as a job application or an application to rent an apartment. This embodiment is a specific example of the more generic method of enabling a party to retrieve information discussed above with respect to FIG. 15. In FIG. 16, however, the party may be provided with the opportunity to provide a form to the USR software 18, the fields of which may be automatically completed with information from the job application information section of the USR database 24.

As can be seen from the above, many of the users of the USR system are organizations or agencies such as carriers (post office, UPS, FedEX), communication companies, law enforcement organizations, hospitals and other medical facilities and the like. Each of these organizations can be provided with specialized software either on a disc or other suitable media or electronically, for example over the internet, which performs a number of functions, for example automatically generating status codes for data access requests, controlling information received, and formatting data received in response to a request in a desired way. This can result in an access request from such organization for a given user causing all data on the user required to complete the form being retrieved and presented to the organization in the format of their form. A user may also authorize an organization for which a form has been completed using the USR system to receive updates, either in response to a request from the organization or at selected intervals, for example once a year, so as to maintain information in the forms current. Since the user will be providing information to the system on a regular basis, this is a relatively easy and painless way for the user to maintain current information with many organizations the user deals with.

Another potential use of the system is to permit a person to be located where only limited biographical information on the person is known. Users of the USR system wishing to participate in this feature could be cued to provide non-confidential biographical data when they come on the system or at any time thereafter when they decide to participate. They can also indicate whether they wish their name given out in response to such an inquiry or to merely be alerted to an inquiry which might involve them and information on the requester. A person seeking to find another person or group of people can input appropriate biographical data, for example members of 1975 Harvard University hockey team, or information of a person's last known address plus school information, etc. The system will then provide a list of persons who meet the listed criteria from which the person making the inquiry can hopefully find the person they are looking for.

In the above application and others, when a person is located, the person may request that only the person's address code or general access code (i.e. a single code which is used to get current address, telephone, e-mail, etc. information) be provided when the person is located. This can further protect the individual from undesired contacts.

Figure 17:
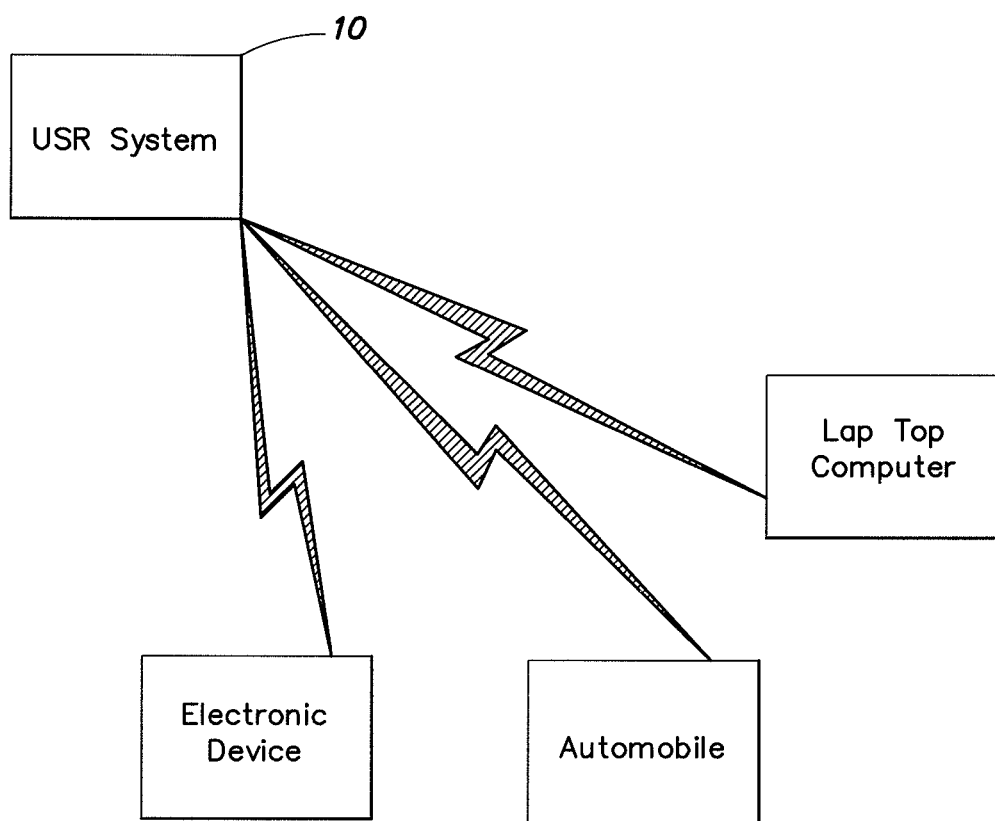
FIG. 17 is a functional block diagram of an embodiment configured to use information in the USR system to activate or keep active property secured through the USR system.

FIG. 17 illustrates another embodiment of the invention. As shown in FIG. 17, the USR system 10 may be used to secure expensive personal equipment, such as stereos, televisions, laptop computers, cellular telephones, cars, boats, and other items of value to a person. In this embodiment, each item to be secured using the USR system is provided with a USR timer chip imbedded in the electronics. If the USR timer chip is not provided with a code within a predefined period of time, for example every 30 days, the equipment is deactivated. Thus, for example, a television, mobile phone, laptop computer, automobile, heavy equipment, weapon or facility may be provided with a security chip having an internal timer that must be reset before expiration by provision of a particular code. When reset does not occur, the timer will disable the electronic device or other device using any one of a number of known disablement methods. Exemplary codes may be transmitted in the same manner as beeper signals are conventionally transmitted or may be transmitted to wired devices over the Internet or other public network.

The USR system 10 may be advantageously employed to automatically provide the secured property with the necessary codes at appropriate intervals, unless instructed by the user of the USR system 10 to cease doing so. Alternatively, the USR system 10 may require participation by the user prior to sending out the activation codes.

In this embodiment, the user may provide to the USR system 10, information indicative of the codes to be transmitted, timing information, and automation information whether the codes should be sent automatically or should require user intervention. Optionally, where the user opts to require user intervention, the USR system 10 may notify the user of the upcoming deadline via e-mail or another method.

This system may be useful to secure sensitive equipment other than personal equipment as well, such as military equipment, public equipment, school equipment and any other equipment that is subject to theft.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An authentication system to authenticate a user involved in a transaction with a provider, the system comprising:

a communications interface configured to receive a time-varying code from the provider that was generated by an electronic device, wherein the time-varying code is generated by the electronic device responsive to successful verification of biometric information at the point of use of the electronic device, and wherein the time-varying code includes a time value representative of a time at which the time-varying code is generated; and one or more processors configured to retrieve account information associated with a user of the electronic device, wherein the account information is retrieved in response to receiving the time-varying code, extracting the time value from the time-varying code, and mapping the time-varying code to the account information using the time value and the time-varying code, and to send the retrieved account information to a third party to enable or deny the transaction with the provider without providing the account information to the provider.

2. The system of claim 1 wherein the transaction is a purchase transaction and the account information is credit or bank card information.

3. The system of claim 1 wherein the time-varying code is encrypted and the one or more processors are configured to decrypt the time-varying code after the time-varying code is received by the communications interface.

4. The system of claim 1 wherein the time-varying code is associated with a public identification code for a credit or bank card account, and wherein the public identification code for the credit or bank card account is received by the third party to enable or deny the transaction, which is a credit or bank card issuer.

5. The system of claim 1 further comprising a database including secure data for a plurality of users, wherein the one or more processors are configured to determine access privileges to at least a portion of the secure data based on the received time-varying code.

6. The system of claim 1 wherein the biometric information comprises fingerprint information, voice print information, signature information, iris information, facial scan information, or DNA information.

7. A method for authenticating a user involved in a transaction with a provider using a computer system, the method comprising:

receiving a one-time code from the provider that was generated by an electronic device, wherein the one-time code is generated by the electronic device responsive to successful verification of biometric information at a point of use of the electronic device, and wherein the one-time code is received without communicating with the electronic device;

accessing account identifying information or user identifying information associated with the user of the electronic device in response to:

receiving the one-time code;

mapping the one-time code to the account identifying information or the user identifying information using the one-time code; and executing a restriction mechanism to determine compliance with any access restrictions for a party transacting with the user based on an identity of the party transacting with the user, and sending the accessed account identifying information or user identifying information to a third party to enable or deny the transaction with the provider without providing the accessed account identifying information or user identifying information to the provider.

8. The method of claim 7 wherein the one-time code comprises a code associated with credit or bank card information of the user.

9. The method of claim 8 wherein the code associated with credit or bank card information does not contain the credit or bank card information.

10. The method of claim 7 wherein the one-time code is selected from the group consisting of a one-time nonpredictable code, a time variant code, and a transaction-specific code, and the method further comprising decrypting the received one-time code.

11. The method of claim 7 wherein the one-time code is associated with a public identification code for a credit or bank card account, and the method further comprising receiving the public identification code for the credit or bank card account by a credit or bank card issuer to enable the transaction.

12. The method of claim 7 further comprising storing secure data for a plurality of users, and determining access privileges to at least a portion of the secure data based on the received one-time code.

13. The method of claim 7 wherein the biometric information comprises fingerprint information, voice print information, signature information, iris information, facial scan information, or DNA information.

14. A computer readable medium or media containing instructions for authenticating a user involved in a transaction with a provider, wherein execution of the instructions by one or more processors of a computer system causes the one or more processors to carry out the steps of:

receiving a time-varying code from the provider that was generated by an electronic device, wherein the time-varying code is generated by the electronic device responsive to successful verification of biometric information at a point of use of the electronic device;

accessing account identifying information or user identifying information associated with the user of the electronic device in response to:

receiving the time-varying code without communicating with the electronic device:

extracting the time value from the time-varying code;

mapping the time-varying code to the account identifying information or the user identifying information using the time value and the time-varying code; and executing a restriction mechanism to determine compliance with any access restrictions for a party transacting with the user based on an identity of the party transacting with the user; and sending the accessed account identifying information or user identifying information to a third party to enable or deny the transaction with the provider without providing the accessed account identifying information or user identifying information to the provider.

15. The computer readable medium or media of claim 14, wherein the time-varying code comprises a code associated with credit or bank card information of the user.

16. The computer readable medium or media of claim 15, wherein the code associated with credit or bank card information does not contain the credit or bank card information.

17. The computer readable medium or media of claim 14, wherein the time-varying code is selected from the group consisting of a one-time nonpredictable code, a time variant code, and a transaction-specific code, and wherein execution of the instructions by the one or more processors of the computer system causes the one or more processors to carry out the step of decrypting the received time-varying code.

18. The computer readable medium or media of claim 14, wherein the time-varying code is associated with a public identification code for a credit or bank card account, and wherein execution of the instructions by the one or more processors of the computer system causes the one or more processors to carry out the step of receiving the public identification code for the credit or bank card account by a credit or bank card issuer to enable the transaction.

19. The computer readable medium or media of claim 14, wherein execution of the instructions by the one or more processors of the computer system causes the one or more processors to carry out the step of: storing secure data for a plurality of users and determining access privileges to at least a portion of the secure data based on the received time-varying code.

20. The computer readable medium or media of claim 14, wherein the biometric information comprises fingerprint information, voice print information, signature information, iris information, facial scan information, or DNA information.

21. A method for enabling a transaction involving a first party and a user, the method comprising:
receiving authentication information of the user, wherein the authentication information comprises one or more of (a) biometric information and (b) a PIN or code;
authenticating an identity of the user based on the received authentication information;
generating a one-time code in response to authenticating the user, wherein at least a portion of the one-time code is used to access account identifying information or user identifying information, and wherein the one-time code includes a time value representative of when the one-time code is generated;
communicating a signal comprising the one-time code to the first party in order to enable a transaction on behalf of the user;
receiving, at the first party, the one-time code; and
accessing the account identifying information or the user identifying information in response to:
receiving the one-time code;
extracting the time value from the one-time code;
mapping the one-time code to the account identifying information or the user identifying information using the time value and the one-time code; and
executing a restriction mechanism to determine compliance with any access restrictions for the first party based on an identity of the first party.

22. The method of claim 21 wherein communicating the signal comprising the one-time code to the first party comprises communicating a signal comprising the one-time code to a merchant or a credit card company.

23. The method of claim 21 wherein generating the one-time code comprises generating a code that is associated with credit or bank card information of the user.

24. The method of claim 23 wherein generating the code associated with credit or bank card information comprises generating a code that does not contain the credit or bank card information.

25. The method of claim 21 wherein generating the one-time code comprises generating a one-time code selected from the group consisting of a one-time nonpredictable code, a time variant code, and a transaction-specific code, and the method further comprising encrypting the one-time code before communicating the signal to the first party.

26. The method of claim 21 wherein generating the one-time code comprises generating a one-time code associated with a public identification code for a credit or bank card account, and wherein the public identification code for the credit or bank card account is communicated to a credit or bank card issuer to enable the transaction.

27. The method of claim 21 further comprising receiving fingerprint information, voice print information, signature information, iris information, facial scan information, or DNA information from a biometric sensor and authenticating the identity of the user based on the received information from the biometric sensor and the PIN or code.

28. The system of claim 1, wherein the one or more processors are configured to retrieve the account information during a transaction process executed subsequent to a training process, and wherein during the training process the one or more processors are configured to receive access restriction information indicating one or more entities that are allowed to access the account information of the user.

29. The system of claim 28, wherein the one or more processors are further configured to determine, during the transaction process, compliance with the access restriction information for an entity transacting with the user indicated by the time-varying code.

30. The system of claim 1, wherein the one or more processors are configured to receive the time-varying code without sending communications to the electronic device.

31. The system of claim 1, wherein the one or more processors are further configured to provide, to the electronic device, a validation code identifying the one or more processors to enable an identity of the one or more processors to be authenticated to the electronic device.

32. The system of claim 1, wherein the one or more processors are configured to retrieve the account information during a transaction process executed subsequent to a training process during which the one or more processors are configured to receive a user specification of the account information, and wherein the one or more processors are configured to access the account information during the transaction process to enable the transaction on behalf of the user.

33. The method of claim 7, wherein receiving the one-time code is performed during a transaction process executed subsequent to a training process, and wherein the training process includes receiving and storing the account identifying information or the user identifying.

34. The method of claim 7, wherein the one-time code includes a time value representative of a time at which the one-time code is generated.

35. The method of claim 34, further comprising:
extracting the time value from the one-time code; and
mapping the one-time code to the account identifying information or the user identifying information using the time value and the one-time code.

36. The computer readable medium of claim 14, wherein executing the restriction mechanism further enables the computer system to allow the transaction based on the determined compliance with any access restrictions.

37. The computer readable medium of claim 14, wherein receiving the time-varying code is executed during a transaction process subsequent to a training process during which the account identifying information or the user identifying information is received and stored at a database associated with the computer system.

38. The computer readable medium of claim 14, wherein the instructions further cause the one or more processors to carry out the steps of providing, to the electronic device, a validation code identifying the computer system to enable the electronic device to authenticate an identity of the computer system based on the validation code.

39. The computer readable medium of claim 14, wherein the time-varying code includes a time value representative of a time at which the time-varying code is generated.

40. The method of claim 21, further comprising:
    receiving the one-time code during a transaction process executed subsequent to a training process; and
    receiving at least one indication of the access restrictions during the training process.

\* \* \* \* \*